United States Patent
Schneider

(10) Patent No.: US 8,191,926 B2
(45) Date of Patent: *Jun. 5, 2012

(54) INFLATABLE AIRBAG ASSEMBLY WITH AN AIRBAG HOUSING VENT PANEL

(75) Inventor: David W. Schneider, Waterford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/843,708

(22) Filed: Jul. 26, 2010

(65) Prior Publication Data

US 2012/0018990 A1    Jan. 26, 2012

(51) Int. Cl.
*B60R 21/30* (2006.01)

(52) U.S. Cl. .................................... 280/739; 280/743.1

(58) Field of Classification Search .................. 280/736, 280/739, 740, 741, 742
See application file for complete search history.

(56) References Cited

U.S. PATENT DOCUMENTS

| | | | |
|---|---|---|---|
| 4,126,325 A | 11/1978 | Weman | |
| 5,246,250 A | 9/1993 | Wolanin et al. | |
| 5,366,242 A | 11/1994 | Faigle et al. | |
| 5,405,166 A | 4/1995 | Rogerson | |
| 6,126,191 A | 10/2000 | Pepperine et al. | |
| 6,139,048 A | 10/2000 | Braunschädel | |
| 6,382,664 B1 * | 5/2002 | Hirano et al. | 280/730.2 |
| 6,550,807 B1 | 4/2003 | Faigle et al. | |
| 6,648,371 B2 | 11/2003 | Vendely et al. | |
| 6,746,045 B2 | 6/2004 | Short et al. | |
| 6,959,945 B2 | 11/2005 | Fischer et al. | |
| 6,991,258 B2 | 1/2006 | Hawthorn et al. | |
| 7,017,945 B2 | 3/2006 | DePottey et al. | |
| 7,036,843 B2 | 5/2006 | Okamoto et al. | |
| 7,261,319 B2 | 8/2007 | DePottey et al. | |
| 7,318,602 B2 | 1/2008 | DePottey et al. | |
| 7,328,915 B2 | 2/2008 | Smith et al. | |
| 7,347,450 B2 | 3/2008 | Williams et al. | |
| 7,413,218 B2 | 8/2008 | Ekdahl | |
| 7,481,456 B2 * | 1/2009 | Nozaki et al. | 280/743.1 |
| 7,494,151 B2 | 2/2009 | Maripudi | |
| 7,543,849 B2 * | 6/2009 | Bradburn | 280/739 |
| 7,584,993 B2 * | 9/2009 | Yamaji et al. | 280/736 |
| 7,597,356 B2 * | 10/2009 | Williams | 280/739 |
| 7,618,059 B2 * | 11/2009 | Hall et al. | 280/736 |

(Continued)

FOREIGN PATENT DOCUMENTS

WO    WO 2008/127756    10/2008

OTHER PUBLICATIONS

U.S. Appl. No. 12/608,828 titled Inflatable Airbag Assembly With an Airbag Housing Vent Panel, filed Oct. 29, 2009.

(Continued)

*Primary Examiner* — Faye M. Fleming
(74) *Attorney, Agent, or Firm* — Sally J. Brown; Stoel Rives LLP

(57) ABSTRACT

Vents in inflatable airbags can be used to soften airbags during deployment by allowing inflation gas to exit from the interior of the airbag. Airbag vents can be used in conjunction with vents in an airbag housing and a vent panel that can align with airbag vent with the housing vent and cover the aperture of the housing vent.

28 Claims, 25 Drawing Sheets

U.S. PATENT DOCUMENTS

| | | | |
|---|---|---|---|
| 7,635,148 B2 * | 12/2009 | Sager | 280/739 |
| 7,731,231 B2 | 6/2010 | Schneider et al. | |
| 7,731,233 B2 | 6/2010 | Schneider et al. | |
| 7,770,922 B2 | 8/2010 | Schneider et al. | |
| 7,837,228 B2 * | 11/2010 | Abe | 280/743.1 |
| 2002/0121770 A1 | 9/2002 | Schneider | |
| 2003/0209895 A1 | 11/2003 | Gu | |
| 2005/0098991 A1 | 5/2005 | Nagai et al. | |
| 2006/0071456 A1 | 4/2006 | Jenkins et al. | |
| 2006/0208472 A1 | 9/2006 | DePottey et al. | |
| 2007/0170709 A1 | 7/2007 | Braun et al. | |
| 2008/0073893 A1 | 3/2008 | Schneider | |
| 2008/0252052 A1 | 10/2008 | Schneider et al. | |
| 2008/0252053 A1 | 10/2008 | Schneider et al. | |
| 2010/0052298 A1 | 3/2010 | Schneider et al. | |
| 2010/0140908 A1 * | 6/2010 | Abe | 280/739 |
| 2011/0079988 A1 * | 4/2011 | Bauer et al. | 280/728.1 |
| 2011/0101663 A1 * | 5/2011 | Schneider | 280/743.1 |

OTHER PUBLICATIONS

Notice of Allowance dated Mar. 25, 2010 in U.S. Appl. No. 11/786,559, now issued as U.S. Patent No. 7,731,231 (8 pgs.).
Notice of Allowance dated Feb. 8, 2010 in U.S. Appl. No. 11/786,559, now issued as U.S. Patent No. 7,731,231 (7 pgs.).
Terminal Disclaimer dated Nov. 16, 2009 in U.S. Patent Application No. 11/786,559, now issued as U.S. Patent No. 7,731,231 (1 pg.).
Amendment and Response dated Nov. 16, 2009 in U.S. Appl. No. 11/786,559, now issued as U.S. Patent No. 7,731,231 (12 pgs.).
Office Action dated May 15, 2009 in U.S. Appl. No. 11/786,559, now issued as U.S. Patent No. 7,731,231 (10 pgs.).
Response to Requirement for Election of Species dated Apr. 9, 2009 in U.S. Appl. No. 11/786,559, now issued as U.S. Patent No. 7,731,231 (9 pgs.).
Office Action—Election Restriction dated Mar. 9, 2009 in U.S. Appl. No. 11/786,559, now issued as U.S. Patent No. 7,731,231 (5 pgs.).
Request for Continued Examination filed Mar. 4, 2010 in U.S. Appl. No. 11/786,559, now U.S. Patent No. 7,731,231.
Notice of Allowance and Fee(s) Due issued Mar. 25, 2010 in U.S. Appl. No. 11/786,559, now U.S. Patent No. 7,731,231.
Office Action issued Mar. 9, 2009 in U.S. Appl. No. 12/133,267, now U.S. Patent No. 7,731,233.
Response to Requirement for Election of Species filed Apr. 9, 2009 in U.S. Appl. No. 12/133,267, now U.S. Patent No. 7,731,233.
Office Action issued May 15, 2009 in U.S. Appl. No. 12/133,267, now U.S. Patent No. 7,731,233.
Amendment and Response to Office Action filed Nov. 16, 2009 in U.S. Appl. No. 12/133,267, now U.S. Patent No. 7,731,233.
Notice of Allowance and Fee(s) Due issued Feb. 9, 2010 in U.S. Appl. No. 12/133,267, now U.S. Patent No. 7,731,233.
Request for Continued Examination filed Mar. 4, 2010 in U.S. Appl. No. 12/133,267, now U.S. Patent No. 7,731,233.
Notice of Allowance and Fee(s) Due issued Mar. 23, 2010 in U.S. Appl. No. 12/133,267, now U.S. Patent No. 7,731,233.
Office Action issued Sep. 4, 2009 in U.S. Appl. No. 12/204,626, now U.S. Patent No. 7,770,922.
Amendment and Response to Office Action filed Mar. 2, 2010 in U.S. Appl. No. 12/204,626, now U.S. Patent No. 7,770,922.
Notice of Allowance and Fee(s) Due issued Apr. 7, 2010 in U.S. Appl. No. 12/204,626, now U.S. Patent No. 7,770,922.
Supplemental Notice of Allowance issued Jun. 16, 2010 in U.S. Appl. No. 12/204,626, now U.S. Patent No. 7,770,922.
Notification of Transmittal of the International Search Report and the Written Opinion of the International Searching Authority issued Aug. 1, 2008 in International Application No. PCT/US2008/052254.

* cited by examiner

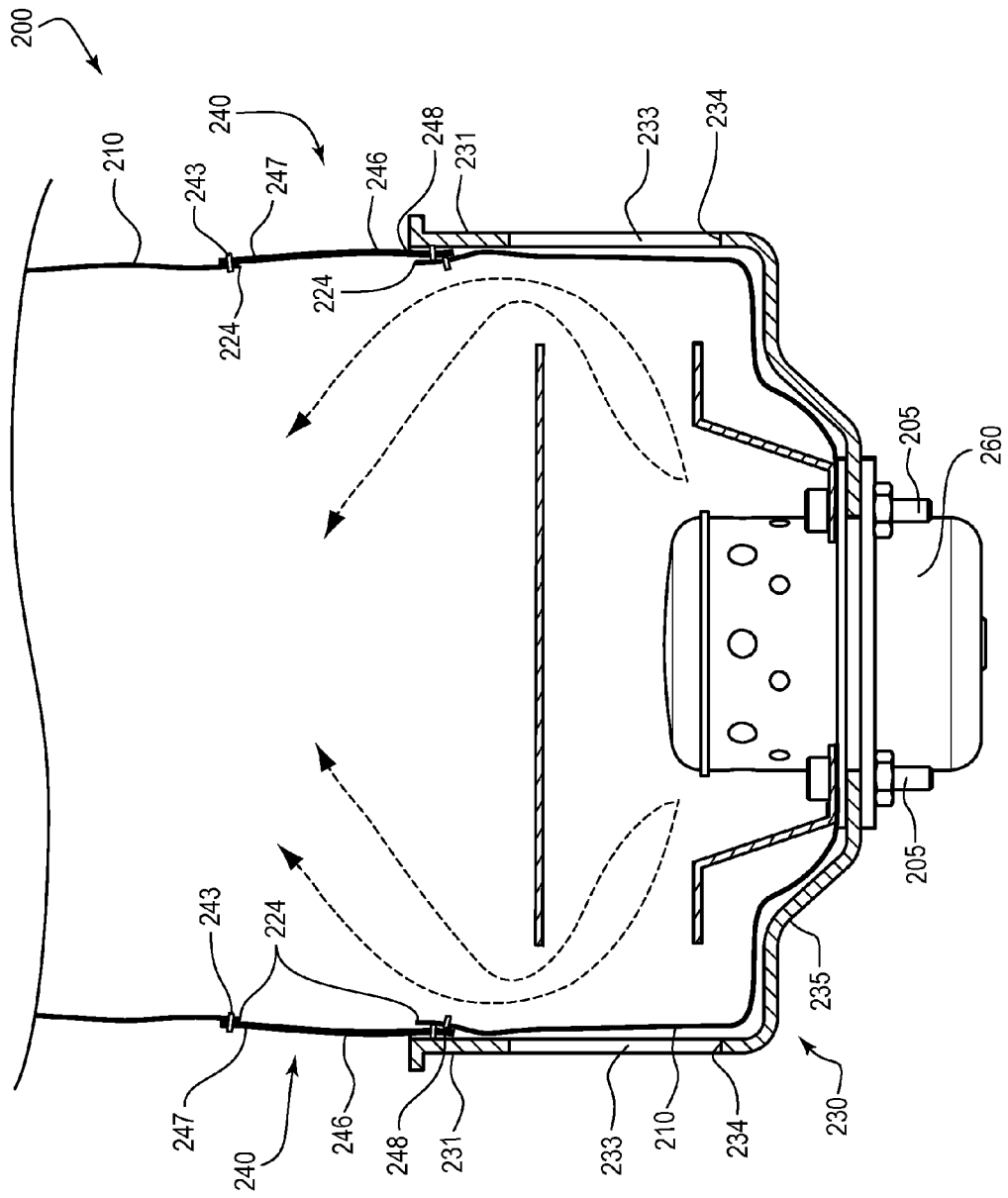

INFLATABLE AIRBAG ASSEMBLY WITH AN AIRBAG HOUSING VENT PANEL

TECHNICAL FIELD

The present disclosure relates generally to the field of automotive safety systems. More specifically, the present disclosure relates to inflatable airbag cushion assemblies.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

FIG. 8C is a cross-sectional view of the airbag assembly of FIG. 8B, wherein the airbag assembly is in a later phase of airbag deployment.

DETAILED DESCRIPTION OF PREFERRED EMBODIMENTS

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in this packaged configuration behind a cover. During a collision event, vehicle sensors trigger the activation of an inflator, which rapidly fills the airbag with inflation gas. Thus the airbag rapidly changes confirmations from the packaged configuration to an expanded configuration.

Figure 1A:
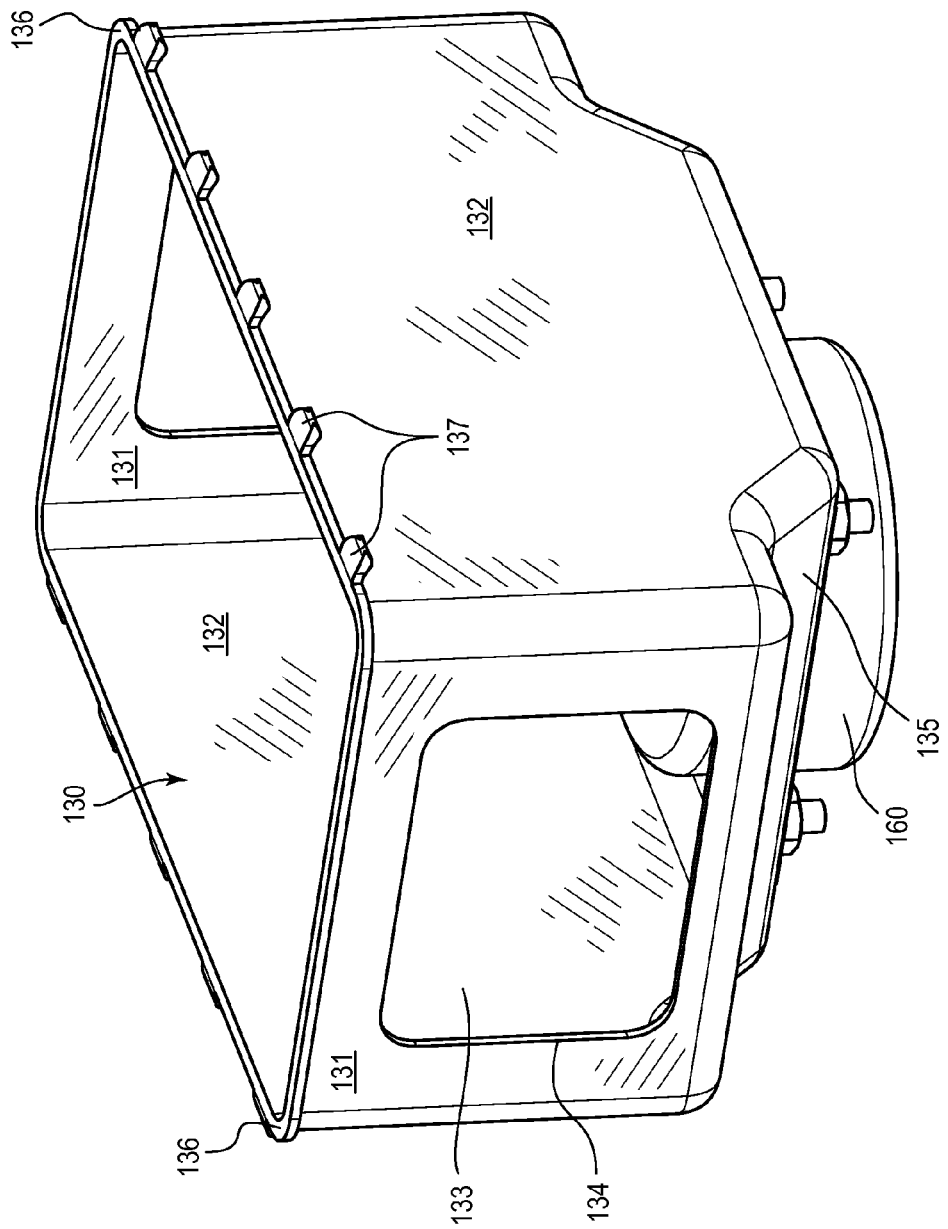
FIG. 1A is a perspective view of one embodiment of an inflatable airbag housing with a vent.
Figure 1B:
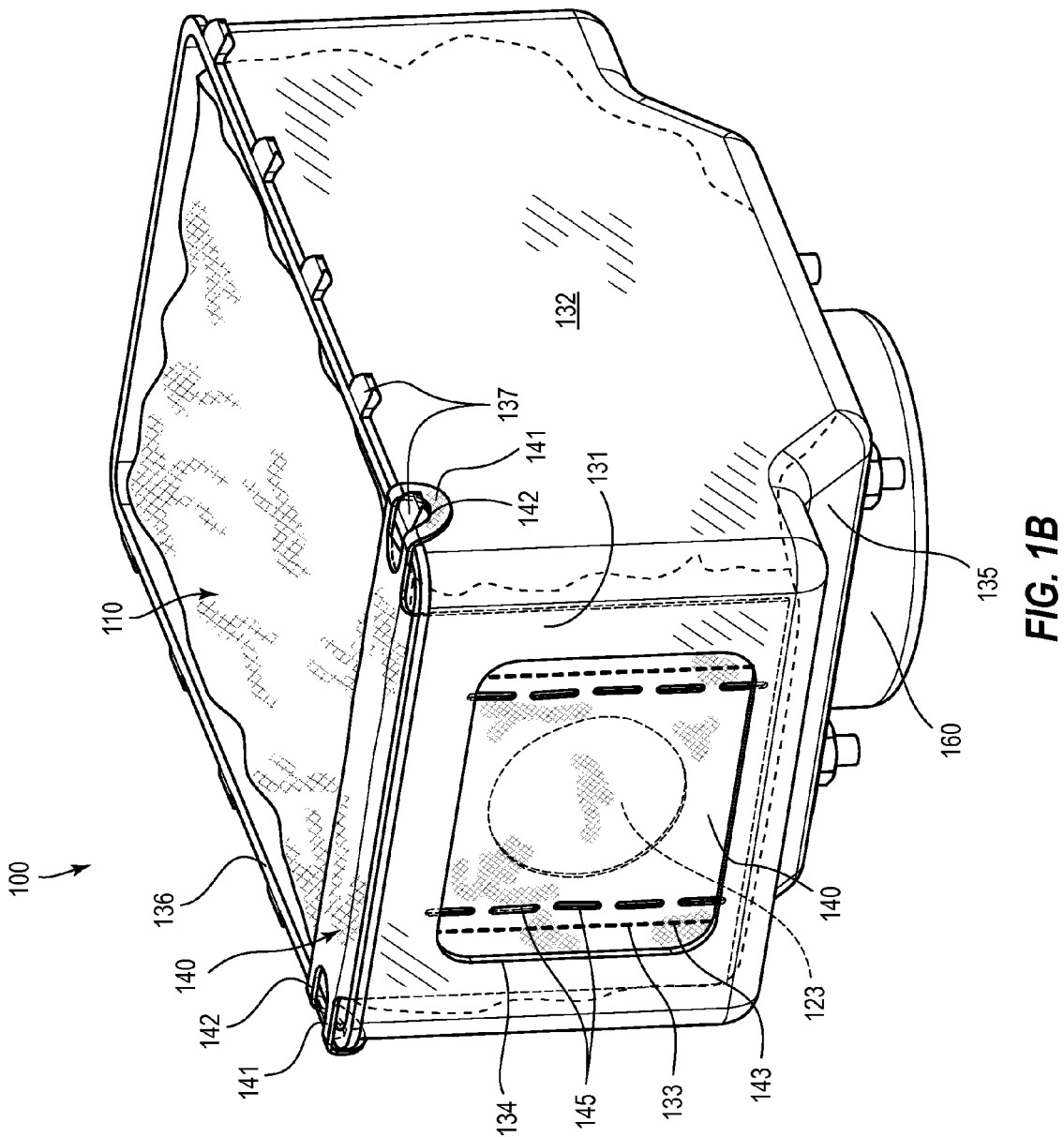
FIG. 1B is a perspective view of the airbag housing of FIG. 1A after an airbag has been placed within the housing and a vent panel has been fitted over the housing vent.

FIG. 1A illustrates a perspective view of an airbag housing 130. FIG. 1B depicts an airbag assembly 100, which comprises an inflatable cushion membrane 110 in addition to housing 130. Airbag assembly 100 also comprises a vent panel 140 and an inflator 160. Airbag housing 130 may comprise a metal container that is fixedly attached to cushion 110 via a throat portion of the cushion. Airbag Housing 130 is configured to be mounted within a vehicle and serves to specifically position airbag assembly 100 so that the cushion may deploy with predetermined characteristics. In the packaged, undeployed state, cushion 110 is contained within housing 130. In other embodiments, housing 130 may comprise one or more plastic portions; one or more composite materials, or a combination of metal, plastic, and composite materials. Airbag housing 130 may comprise two opposing lateral sidewalls 131, two opposing longitudinal sidewalls 132, and a bottom wall 135. Lateral sidewalls 131 may each comprise an aperture 133, defined by a perimeter 134. Apertures 133 are each configured to be aligned with a vent aperture 123 located on inflatable airbag 110.

Vent panel 140 is coupled to inflatable airbag 110 and is aligned with vent aperture 123 of airbag 110 and vent aperture 133 of housing 130. Vent panel 140 is configured to retain apertures 123 and 133 of airbag 110 and housing 130 in an aligned configuration as well as block objects from entering the airbag or the housing via their apertures, when the airbag assembly is in the packaged configuration. Vent panel 140 may be coupled to airbag 110 via one or more seams 143, which in the depicted embodiment comprise stitching. Vent panel 140 also comprises a plurality of rupture seams 145, which in the depicted embodiment comprise perforations 145. Vent panel 140 may comprise extensions 141 that have apertures 142 that are configured to receive extensions 137 that extend away from rim 136 of housing 130. In the depicted embodiment, extensions 137 may be said to comprise "hooks" to which vent extensions 141 may be coupled. During inflatable airbag 110 deployment, extensions 141 may rupture and thereby allow airbag 110 to exit airbag housing 130 and fully deploy.

Figure 2:
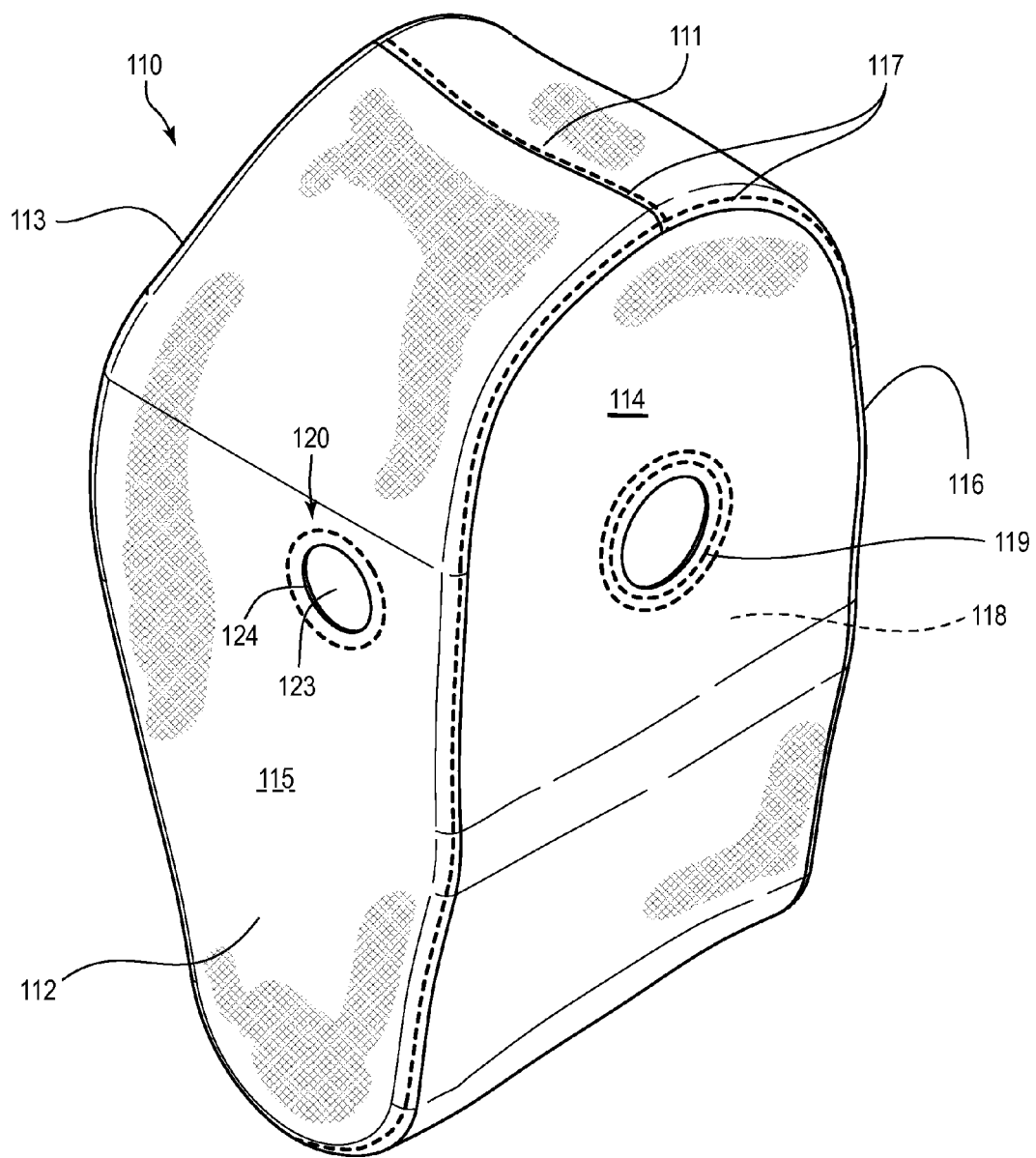
FIG. 2 is a perspective view of an embodiment of an inflatable airbag.

FIG. 2 depicts a perspective view of one embodiment of inflatable airbag 110, which may have an upper portion 111, a lower portion 112, a front face 113, a rear face 114, a first side face 115, a second side face 116, and a throat portion 119. The various faces of cushion membrane 110 define an interior inflatable void 118, which in the packaged configuration, is in fluid communication with the inflator (not shown). The various faces of cushion 110 may be attached to each other using seams 117 that comprise stitching.

Upper portion 111 of cushion 110 is the portion of the cushion that is closest to the headliner of a vehicle when the cushion is in a deployed state. Lower portion 112 is below upper portion 111 when cushion 110 is in a deployed state, and is closest to a floor of the vehicle. The term "lower portion" is not necessarily limited to the portion of cushion 110 that is below a horizontal medial plane of the cushion, but may include less than half, more than half or exactly half of the bottom portion of the cushion. Likewise, the term "upper portion" is not necessarily limited to the portion of cushion 110 that is above a horizontal medial plane of the cushion, but may include less than half, more than half or exactly half of the upper portion of the cushion.

As will be appreciated by those skilled in the art, a variety of types and configurations of airbag cushion membranes can be utilized without departing from the scope and spirit of the present disclosure. For example, the size, shape, and proportions of the cushion membrane may vary according to its use in different vehicles or different locations within a vehicle such that the cushion may comprise an inflatable cushion; a rear passenger side airbag; a driver's airbag; and/or a front passenger airbag. Also, the cushion membrane may comprise one or more pieces of any material well known in the art, such as a woven nylon fabric. Additionally, the airbag cushion may be manufactured using a variety of techniques such as one piece weaving, "cut and sew", or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Vent 120 may be located on one or both of the side faces 115 and 116, such that airbag 110 may comprise a single vent or a plurality of vents. Vent 120 is configured to allow inflation gas to pass from inflatable void 118 of airbag 110 to outside the airbag. Vent 120 may comprise aperture 123 defined by a perimeter 124. Vent 120 may comprise a discreet vent or a dynamic vent. Discreet vents are configured such that they do not change configuration or diameter during inflatable airbag deployment, whereas dynamic vents are configured such that they can change configuration during the course of airbag deployment. Dynamic vents may remain open during airbag deployment or may adopt an open configuration if an obstruction such as an out-of-position occupant is encountered during airbag deployment.

Figure 3:
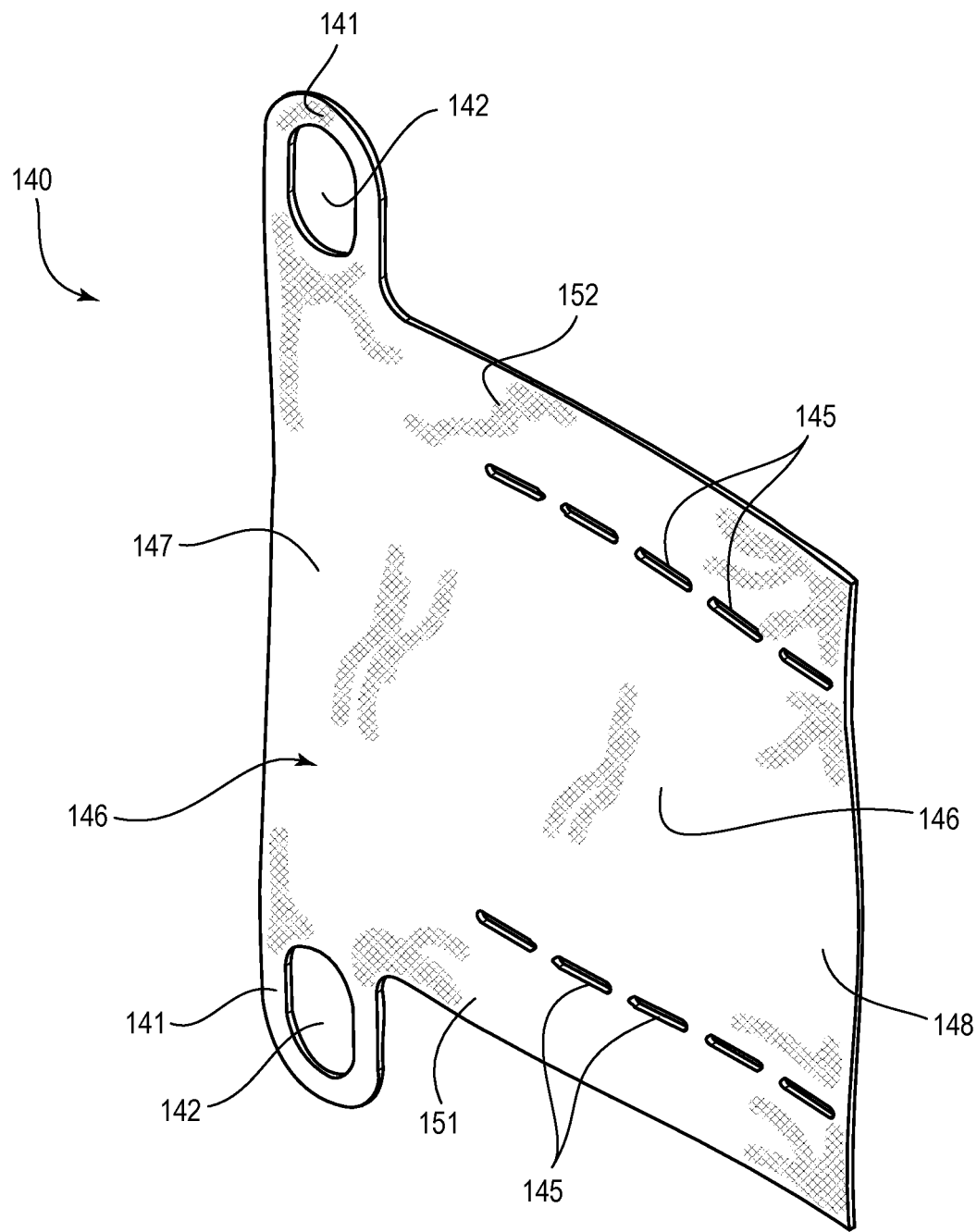
FIG. 3 is a perspective view of an embodiment of a vent panel.

FIG. 3 is a perspective view of an embodiment of vent panel 140. As described above, vent panel 140 may be configured to achieve multiple functions. It is configured to block objects from entering the airbag or the housing via their apertures. It is configured to retain the apertures of the housing and the airbag vents in the aligned configuration, while also allowing the airbag to achieve a fully deployed, fully inflated configuration. Vent panel 140 is configured to function such that the vent aperture of the airbag may be said to be closed in the packaged configuration, become open during early airbag deployment, remain open if the airbag encounters an obstruction during deployment, and become closed again if the airbag does not encounter an obstruction during deployment. The terms "closed" and "open" refer to the vent aperture's ability to vent inflation gas from the interior of the airbag due to obstruction, or lack thereof, by the vent panel, wherein "open" may not imply that the vent is at maximum capacity to vent inflation gas, and "closed" may not imply that the vent is unable to vent inflation gas. "Early" airbag deployment may refer to any time point during inflatable airbag deployment before the airbag is fully deployed and/or inflated.

Vent panel 140 may comprise a first side portion 151 and a second side portion 152 that may represent approximate left and right halves, as seen in FIG. 3. Vent panel 140 may also comprise one or more extensions 141, apertures 142, rupture seams 145, a body portion 146, an upper portion 147, and a lower portion 148.

Figure 4:
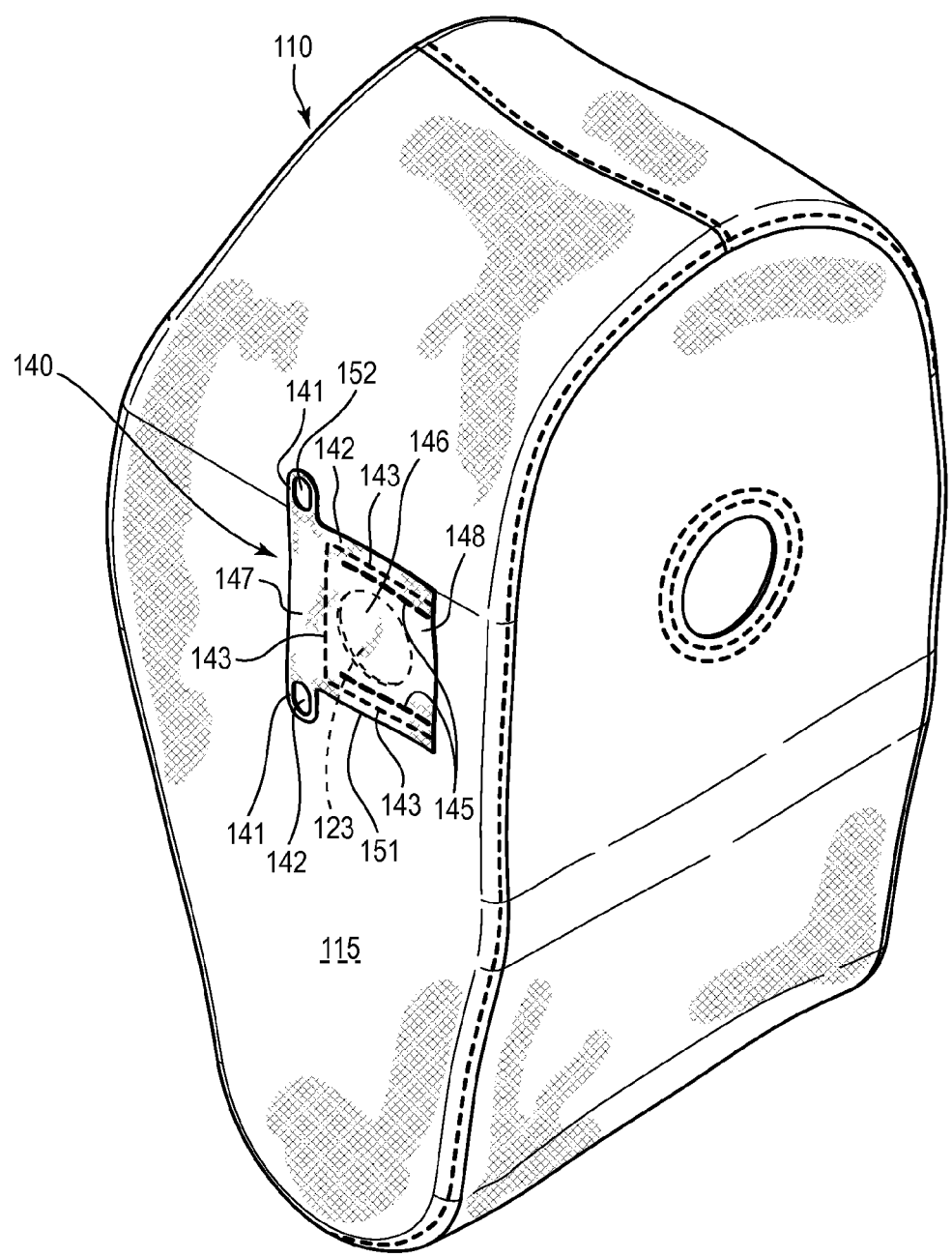
FIG. 4 is a perspective view of the inflatable airbag of FIG. 2 and the vent panel of FIG. 3 after the airbag and the vent panel have been coupled together.

FIG. 4 is a perspective view of a portion of airbag assembly 100, wherein vent panel 140 has been coupled to inflatable airbag 110. Vent panel 140 may be coupled to airbag 110 on side face 115 via one or more seams 143. In the depicted embodiment, vent panel 140 is coupled to airbag 110 at the locations: adjacent to upper portion 147, adjacent to first side portion 151, and adjacent to second side portion 152. In other embodiments, the vent panel may be coupled to the airbag at one, two, four, or more locations. Seams 143 adjacent first and second side portions 151 are located outside of perforations 143, or in other words, the perforations are located adjacent to, but inward of, the seams and/or the first and second side portions. Extensions 141 with apertures 142 may extend away from top portion 147 such that the extensions are substantially perpendicular to first and second side portions 151 and 152. As such, the depicted embodiment of vent panel 140 may be said to be substantially "T" shaped. Body portion 146 is configured to substantially block vent aperture 123 of airbag 110. In another embodiment, the vent panel may comprise all the features and functions of vent panel 140, described herein, except that the vent panel may be described as comprising a "Y" shape.

Figure 5:
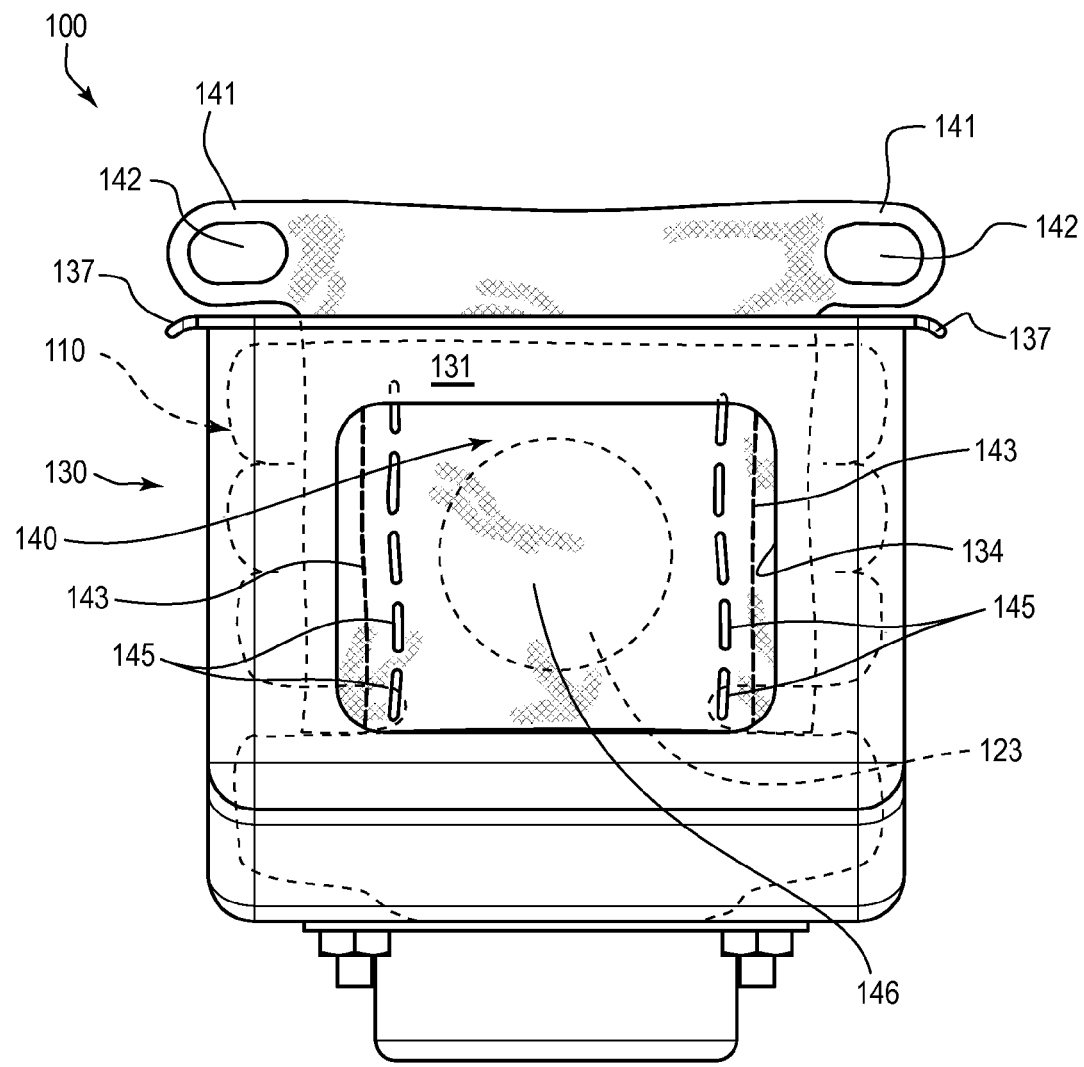
FIG. 5 is a side elevation view of the airbag assembly of FIG. 1B.

FIG. 5 is a side elevation view of airbag assembly 100 depicting one of the lateral sidewalls 131 of housing 130 after vent panel 140 has been coupled to airbag 110 and the airbag has been rolled and/or folded and placed into housing 130. Vent panel 140 may be coupled to airbag 110 via stitching 143 such that body portion 146 substantially blocks vent aperture 123 and such that rupture seams 145 are located on opposing sides of vent aperture 123. In the packaged configuration, extensions 141 may be coupled to housing hooks 137 via apertures 142 such that vent aperture 123 of airbag 110 is in the aligned configuration with the vent aperture of housing 130 that is defined by vent aperture perimeter 134.

Figure 6A:
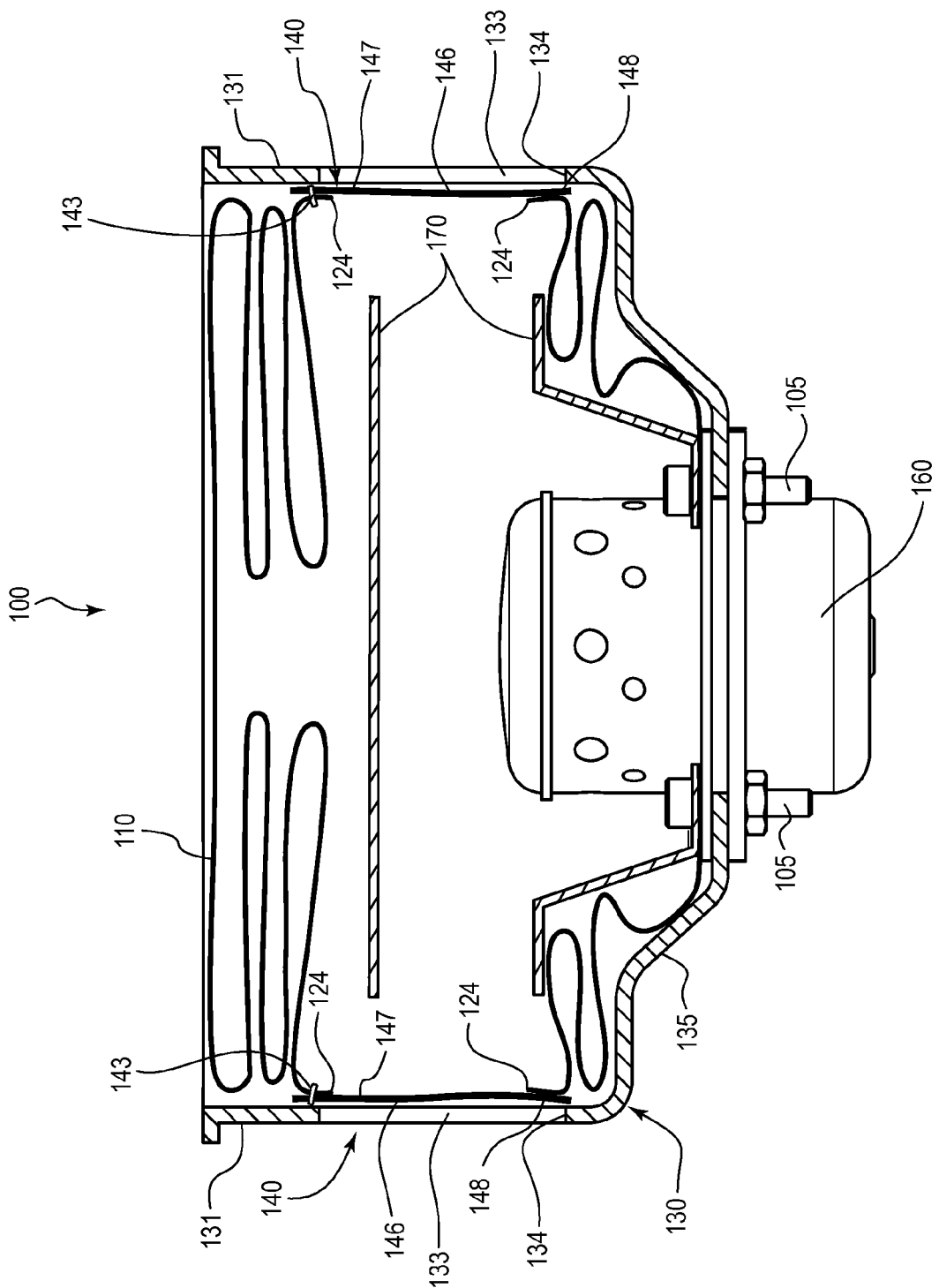
FIG. 6A is a cross-sectional view of the airbag assembly of FIG. 5, wherein the assembly is depicted in a packaged configuration.
Figure 6B:
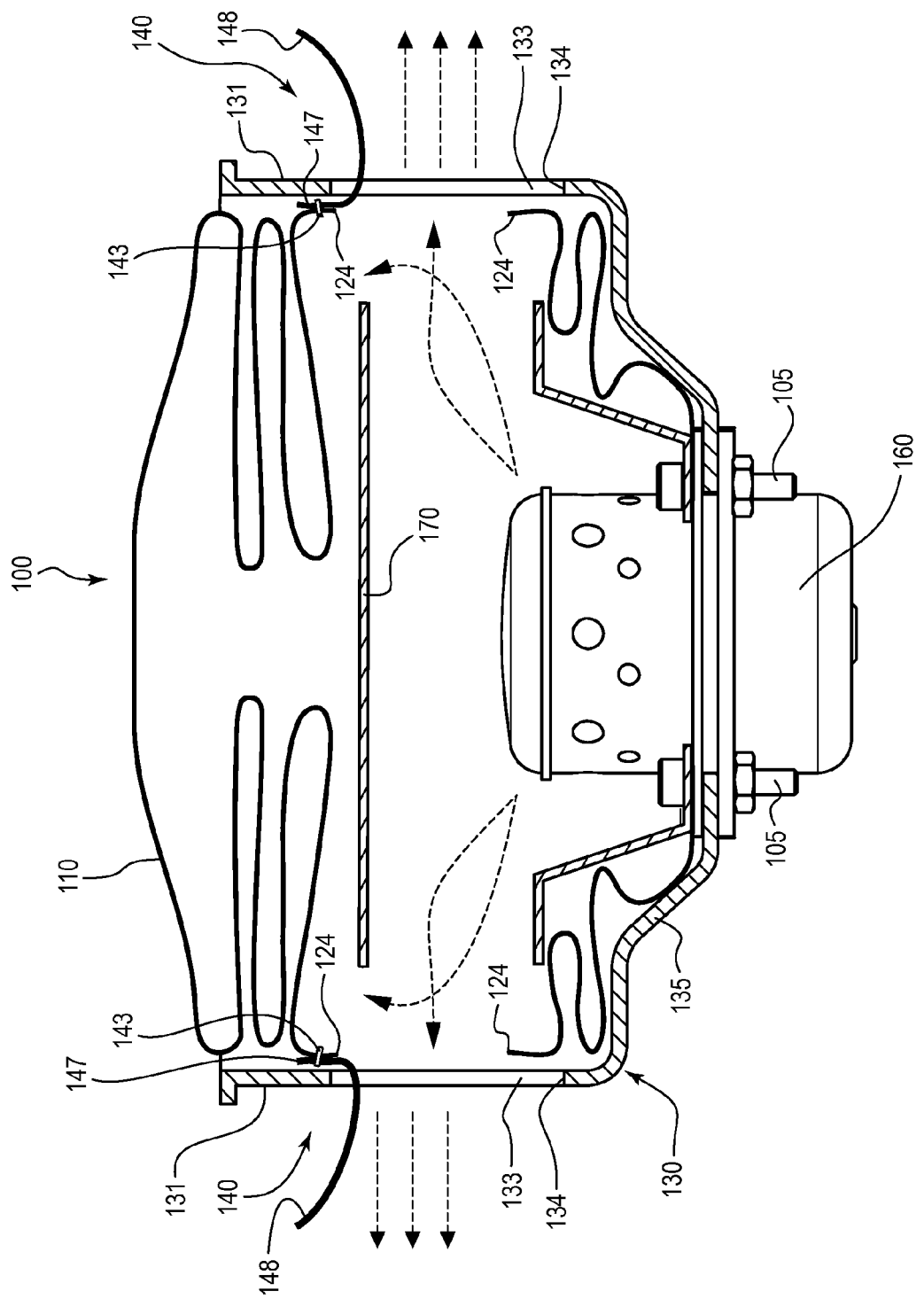
FIG. 6B is a cross-sectional view of the airbag assembly of FIG. 6A, wherein the airbag assembly is in an early phase of airbag deployment.
Figure 6C:
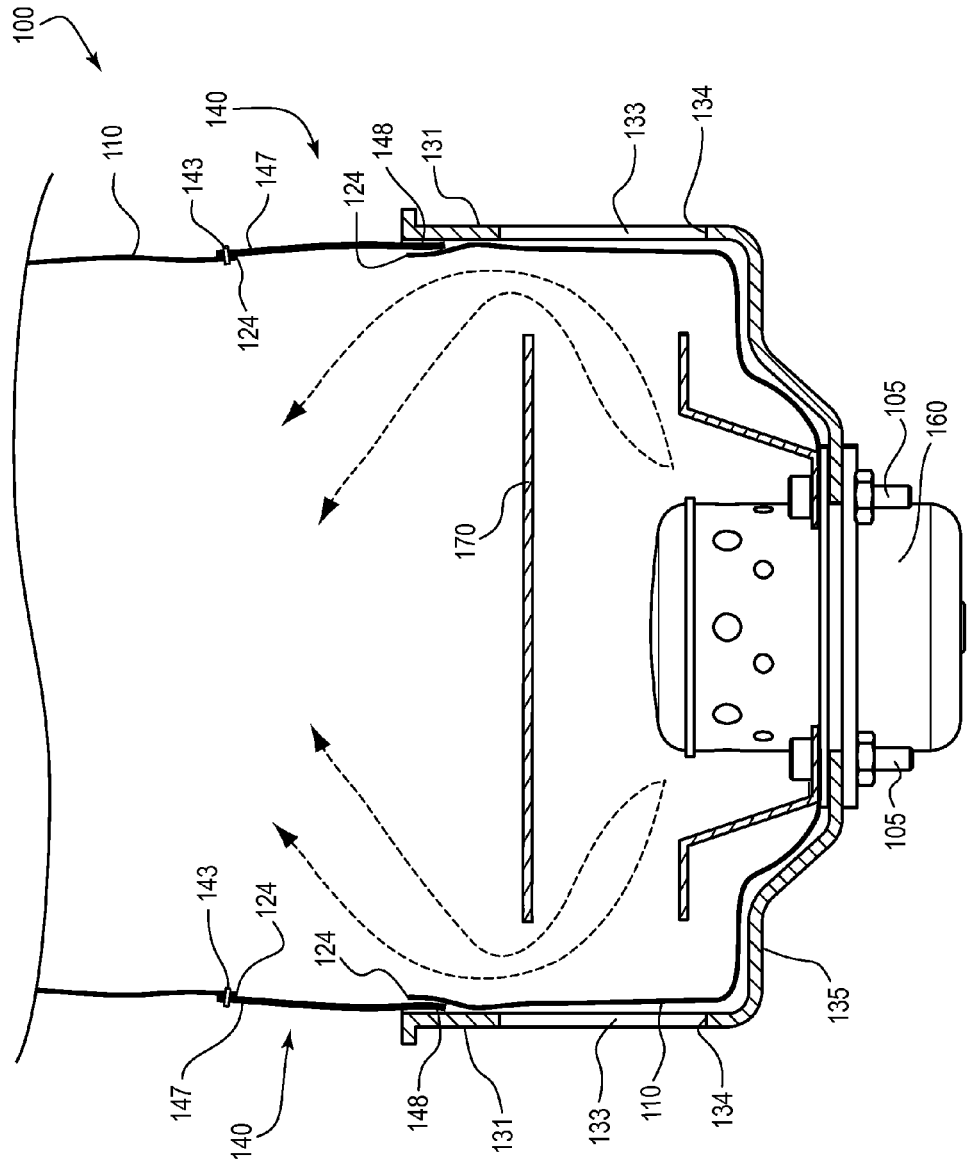
FIG. 6C is a cross-sectional view of the airbag assembly of FIG. 6B, wherein the airbag assembly is in a later phase of airbag deployment.

FIGS. 6A-6C are cross-sectional views of assembly 100, wherein the figures depict a representational inflatable airbag deployment sequence. FIG. 6A depicts the assembly before initiation of the inflator. FIG. 6B depicts assembly 100 in a mid-stage of airbag deployment. FIG. 6C depicts assembly 100 in a late stage of airbag deployment. The terms, "early," "mid-," and "late" stages of airbag deployment are not intended to indicate specific stages or elapsed times of airbag deployment; rather, the terms are meant to indicate a general sequential progression of airbag deployment. In the depictions of FIGS. 6A-6C, inflatable airbag 110, housing 130, inflator 160 and diffuser 170 are coupled together at bottom wall 135 of housing 130 via mounting structures 105. Housing vent apertures 133 defined by vent aperture perimeters 134 are located in lateral sidewalls 131. Diffuser 170 is an optional component of assembly 100. Diffuser 170 may comprise a fabric component that may comprise a plurality of apertures. Some of the apertures of diffuser 170 may be configured such that the diffuser directs some inflation gas toward airbag 110 vent apertures that are defined by vent aperture perimeters 124. Vent panel 140 may be coupled to airbag 110 at an upper portion 147 of the vent panel via stitching 143.

FIG. 6A depicts a cross-sectional illustration of assembly 100 in the packaged configuration. Airbag 110 has been rolled and/or folded and vent panel 140 has been coupled to the airbag such that apertures 123 and 133 are in the aligned configuration. Body portion 146 may be located between airbag 110 vent apertures defined by vent aperture perimeters 124 and housing 130 apertures 133. As such, the airbag vents may be said to be in the closed configuration, and the vent panel may be said to be located between the airbag and the housing. In the depicted embodiment, bottom portion 148 of vent panel 140 is not coupled to airbag 110.

FIG. 6B depicts assembly 100 after inflator 160 has been initiated and inflation gas (depicted as arrows) has begun to be generated and/or released by the inflator. FIG. 6B may also be said to depict assembly 100 at an early stage of airbag deployment. Early in airbag deployment, airbag 110 may not exit housing 130, but may begin to become inflated; alternatively, early in airbag deployment, the airbag may begin to exit the housing. Deflector 170 at least partially directs inflation gas toward vent apertures of airbag 110 that are defined by perimeters 124. When pressure, or tension, is applied to vent panel 140 by the inflation gas, the rupture seams may rupture and thereby allow bottom portion 148 to be pushed out of housing 130 via aperture 133. As illustrated in the figures, a greater portion of vent panel 140 may exit housing 130 via apertures 133, and therefore, it may be said that at least the lower portion 148 of the vent panel may be pushed out of the housing by inflation gas. Upper portion 147 of vent panel 140 remains coupled to airbag 110 via stitching 143 such that the vent panel is not released from the airbag and completely blown out of housing 130.

If during deployment, airbag 110 encounters an obstruction, such as a child car seat or out-of-position occupant, the airbag may not fully deploy. In such a case, airbag 110, vent aperture 133, and vent panel 140 may remain in an aligned configuration, such as depicted in FIG. 6B. The aligned configuration may comprise an at least partial alignment of the airbag vent aperture with the housing vent aperture. The aligned configuration may further comprise the rupture seams of the vent panel having been ruptured such that the airbag vent may be said to be in an open configuration.

FIG. 6C is a cross-sectional view of assembly 100 in a later stage of inflatable airbag deployment without obstruction, wherein inflatable airbag 110 is in a deployed and inflated configuration. In the later stage of deployment of inflatable airbag 110, inflation gas from inflator 160 continues to inflate the airbag such that airbag 110 is pushed further out of housing 130. Since upper region 147 of vent panel 140 remains coupled to airbag 110 via stitching 143, the vent panel is pulled further out of housing 130 along with the airbag. As a result, lower portion 148 of vent panel 140 may be pulled back through vent aperture 133. Vent panel 140 may be configured to overlap vent aperture perimeter 124 of airbag 110, such that when lower portion 148 is pulled back into housing 130, the lower portion may be located between vent aperture perimeter 124 and lateral sidewall 131 of housing 130. Since a magnitude of air pressure within the airbag is greater than a magnitude of air pressure outside the airbag, lower portion 148 of vent panel 140 may be said to be "pinched" between airbag 110 and housing 130. Specifically, lower portion 140 may be pressed in an outward direction by a bottom portion of perimeter 124, and the outward pressure may be opposed by lateral sidewall 131. As such, vent aperture 123 of airbag 110 may be said to be in a closed configuration.

Deflector 170 may continue to direct inflation gas toward housing vent aperture 133, however, the vent aperture may be blocked by airbag 110. As such, vent aperture 133 of airbag housing 130 may be said to be in a closed configuration. Several features of airbag assembly 100 have predetermined dimensions such that in the deployed configuration, the airbag vent apertures and the housing vent apertures may be said to be in a closed configuration. For example, a length of airbag 110, a location and circumference of vent aperture perimeter 124, and a length of vent panel 140 are all predetermined such that in the deployed configuration, bottom portion 148 of vent panel 140 does not extend beyond sidewall 131 or rim 136 of housing 130, and vent panel 140 covers vent aperture perimeter 124.

Figure 7:
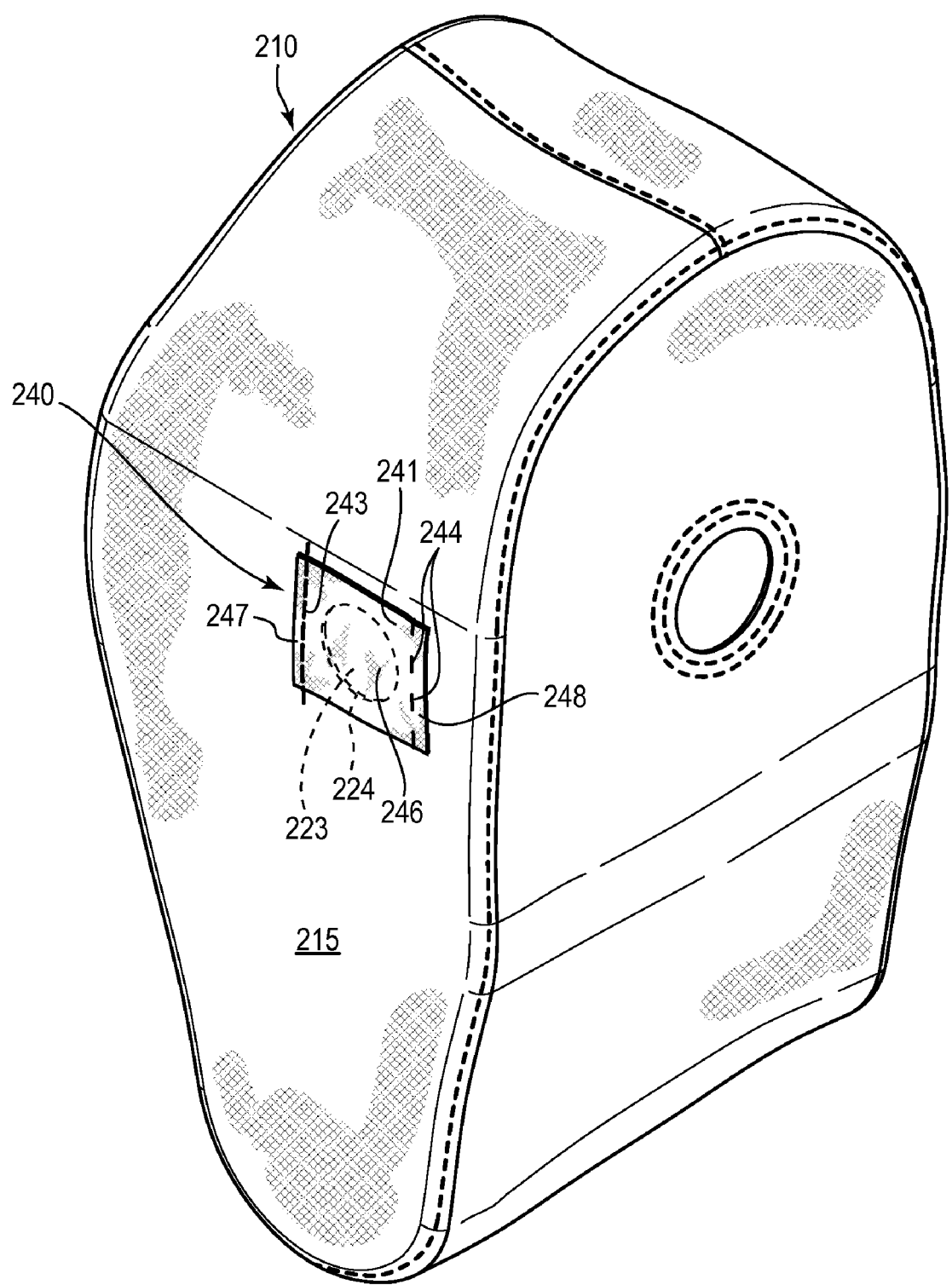
FIG. 7 is a perspective view of a portion of another embodiment of an airbag assembly with a vent panel.

FIGS. 7-8C depict another embodiment of an airbag assembly 200 with a vent panel 240, wherein airbag assembly 200, and vent panel 240 resemble airbag assembly 100, vent panel 140, described above, in certain respects. Accordingly, like features may be designated with like reference numerals, with the leading hundreds numeral incremented from "1" to "2". Any suitable combination of the features described with respect to airbag assembly 100 and vent panel 140 can be employed with assembly 200 and vent panel 240, and vice versa.

FIG. 7 is a perspective view of a portion of another embodiment of an airbag assembly 200 with an inflatable airbag 210 and a vent panel 240. Airbag 210 comprises a vent aperture 223 that is defined by a vent aperture perimeter 224. An upper portion 247 of vent panel 240 is coupled to a side face 215 of airbag 210 via a seam 243, such that a body portion 246 of the vent panel covers vent aperture 223 and perimeter 224. A lower portion 248 of vent panel 240 may be coupled to airbag 210 via a rupture point 244, which in the depicted embodiment comprises tear stitching 244. In other embodiments, the rupture point may comprise a tear seam, or tack stitching. In one embodiment, tear stitching 244 includes, no more than 25 threads per 100 millimeters, although one skilled in the art will appreciate that other thread counts may similarly allow the rupture of stitching 244 during deployment without damaging cushion 210. Thus, tear stitching 244 is configured to rupture during deployment of cushion 210 without damaging the cushion and without retarding or altering cushion deployment.

Figure 8A:
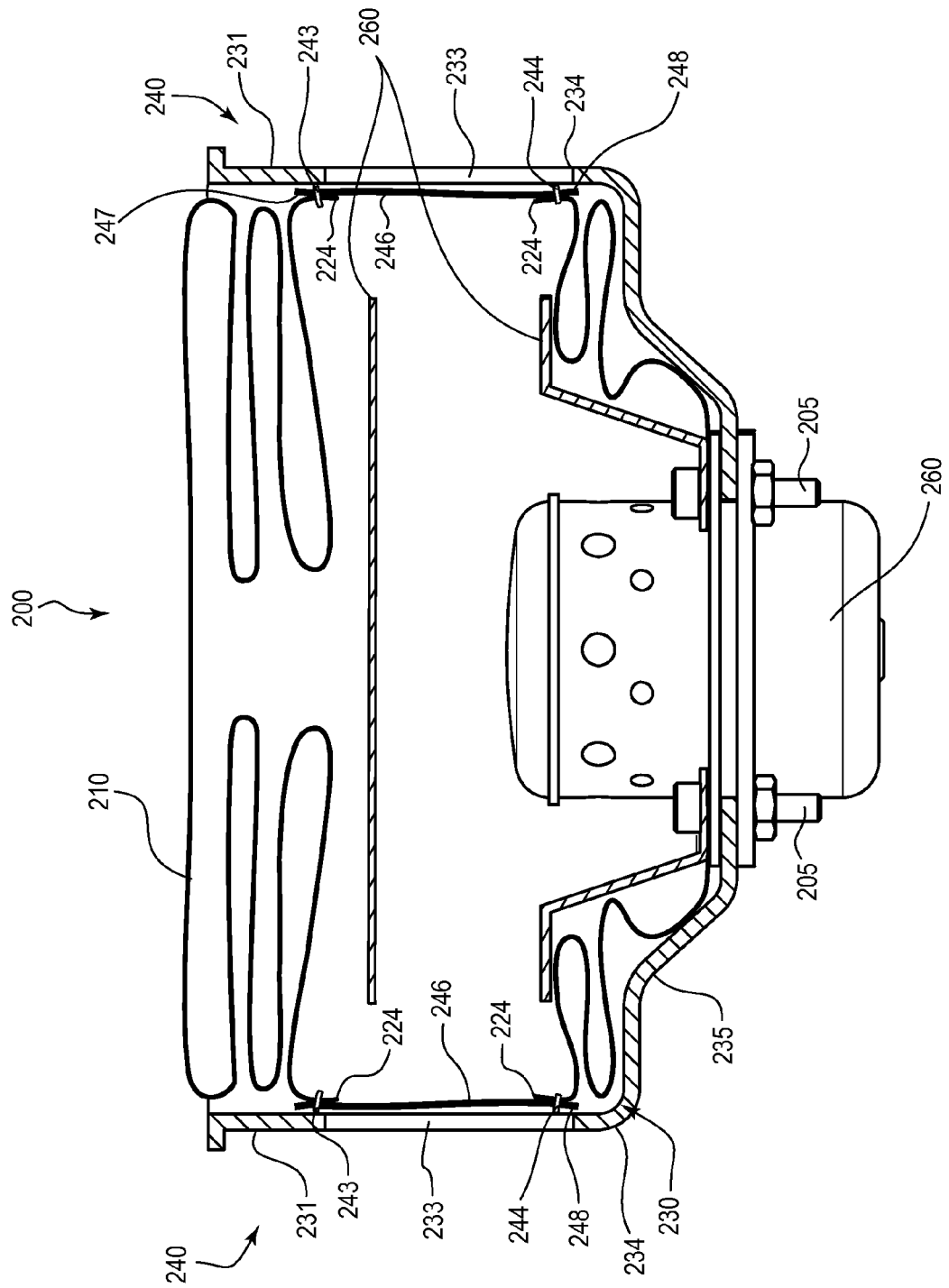
FIG. 8A is a cross-sectional view of the airbag assembly of FIG. 7, wherein the assembly is depicted in a packaged configuration.
Figure 8B:
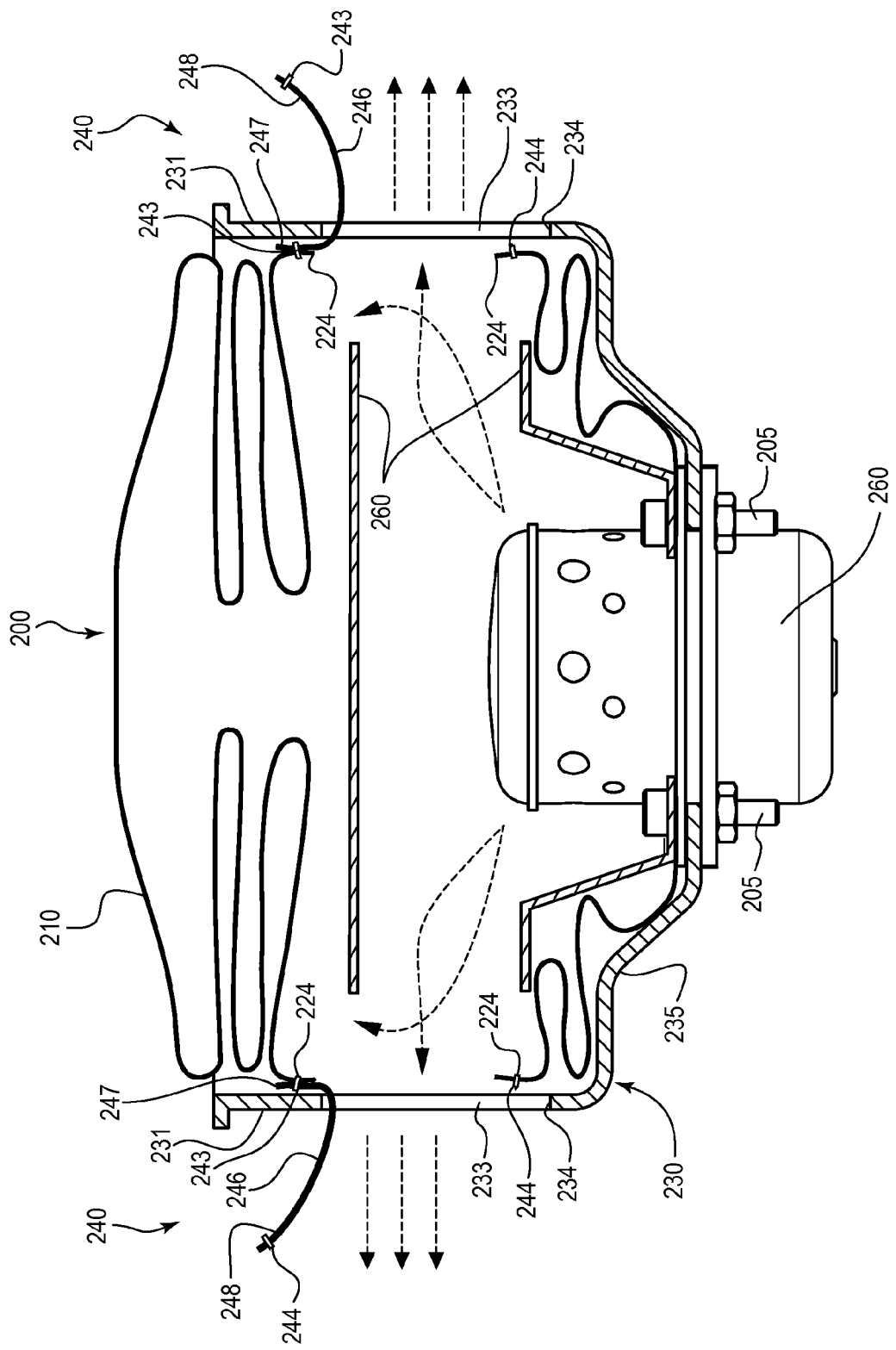
FIG. 8B is a cross-sectional view of the airbag assembly of FIG. 8A, wherein the airbag assembly is in an early phase of airbag deployment.

FIGS. 8A-8C are cross-sectional views of assembly 200, wherein the figures depict a representational inflatable airbag deployment sequence. FIG. 8A depicts the assembly before initiation of the inflator. FIG. 8B depicts assembly 200 in a mid-stage of airbag deployment. FIG. 8C depicts assembly 200 in a late stage of airbag deployment. In the depictions of FIGS. 8A-8C, inflatable airbag 210, housing 230, inflator 260 and diffuser 270 are coupled together at bottom wall 235 of housing 230 via mounting structures 205. Housing vent apertures 233 defined by vent aperture perimeters 234 are located in lateral sidewalls 231. Diffuser 270 is an optional component of assembly 200. Diffuser 270 may comprise a fabric component that may comprise a plurality of apertures. Some of the apertures of diffuser 270 may be configured such that the diffuser directs some inflation gas toward airbag 210 vent apertures that are defined by vent aperture perimeters 224. Vent panel 240 may be coupled to airbag 210 at an upper portion 247 of the vent panel via stitching 243.

FIG. 8A depicts a cross-sectional illustration of assembly 200 in the packaged configuration. Airbag 210 has been rolled and/or folded and vent panel 240 has been coupled to the airbag such that apertures 223 and 233 are in the aligned configuration. Body portion 246 may be located between airbag vent apertures defined by vent aperture perimeters 224 and housing apertures 233. As such, the airbag vents may be said to be in the closed configuration, and the vent panel may be said to be located between the airbag and the housing. In the depicted embodiment, bottom portion 248 of vent panel 240 is coupled to airbag 210 via tear stitching 244.

FIG. 8B depicts assembly 200 after inflator 260 has been initiated and inflation gas (depicted as arrows) has begun to be generated and/or released by the inflator. FIG. 8B may also be said to depict assembly 200 at an early stage of airbag deployment. Early in airbag deployment, airbag 210 may not exit housing 230, but may begin to become inflated; alternatively, early in airbag deployment, the airbag may begin to exit the housing. Deflector 270 at least partially directs inflation gas toward vent apertures of airbag 210 that are defined by perimeters 224. When pressure, or tension, is applied to vent panel 240 by the inflation gas, tear stitching 244 may rupture and thereby allow bottom portion 248 to be pushed out of housing 230 via aperture 233. As illustrated in the figures, a greater portion of vent panel 240 may exit housing 230 via apertures 233, and therefore, it may be said that at least the lower portion 248 of the vent panel may be pushed out of the housing by inflation gas. Upper portion 247 of vent panel 240 remains coupled to airbag 210 via stitching 243 such that the vent panel is not released from the airbag and completely blown out of housing 230.

If during deployment, airbag 210 encounters an obstruction, such as a child car seat or out-of-position occupant, the airbag may not fully deploy. In such a case, airbag 210, vent aperture 233, and vent panel 240 may remain in an aligned configuration, such as depicted in FIG. 8B. The aligned configuration may comprise an at least partial alignment of the airbag vent aperture with the housing vent aperture. The aligned configuration may further comprise the rupture seams of the vent panel having been ruptured such that the airbag vent may be said to be in an open configuration.

FIG. 8C is a cross-sectional view of assembly 200 in a later stage of inflatable airbag deployment without obstruction, wherein inflatable airbag 210 is in a deployed and inflated configuration. In the later stage of inflatable airbag 210 deployment, inflation gas from inflator 260 continues to inflate the airbag such that the airbag is pushed further out of housing 230. Since upper region 247 of vent panel 240 remains coupled to airbag 210 via stitching 243, the vent panel is pulled further out of housing 230 along with the airbag. As a result, lower portion 248 of vent panel 240 may be pulled back through vent aperture 233. Vent panel 240 may be configured to overlap vent aperture perimeter 224 of airbag 210, such that when lower portion 248 is pulled back into housing 230, lower portion 248 may be located between vent aperture perimeter 224 and lateral sidewall 231 of housing 230. Since a magnitude of air pressure within the airbag is greater than a magnitude of air pressure outside the airbag, lower portion 248 of vent panel 240 may be said to be "pinched" between airbag 210 and housing 230. Lower portion 248 of vent panel 240 may also be said to be pressed against housing 230 by airbag 210. Specifically, lower portion 240 may be pressed in an outward direction by a bottom portion of perimeter 224, and the outward pressure may be opposed by lateral sidewall 231. As such, vent aperture 223 of airbag 210 may be said to be in a closed configuration.

Deflector 270 may continue to direct inflation gas toward housing vent aperture 233; however the vent aperture may be blocked by airbag 210. As such, vent aperture 233 of airbag housing 230 may be said to be in a closed configuration. Several features of airbag assembly 200 have predetermined dimensions such that in the deployed configuration, the airbag vent apertures and the housing vent apertures may be said to be in a closed configuration. For example, a length of airbag 210, a location and circumference of vent aperture perimeter 224, and a length of vent panel 240 are all predetermined such that in the deployed configuration, bottom portion 248 of vent panel 240 does not extend beyond sidewall 231 or rim 236 of housing 230, and vent panel 240 covers vent aperture perimeter 224.

FIGS. 9-12B depict another embodiment of an airbag assembly 300, wherein airbag assembly 300 resembles airbag assemblies 100 and 200 described above, in certain respects. Accordingly, like features may be designated with like reference numerals, with the leading hundreds numeral incremented from "1" or "2" to "3". Any suitable combination of the features described with respect to airbag assemblies 100 and 200 with assembly 300, and vice versa.

Figure 9:
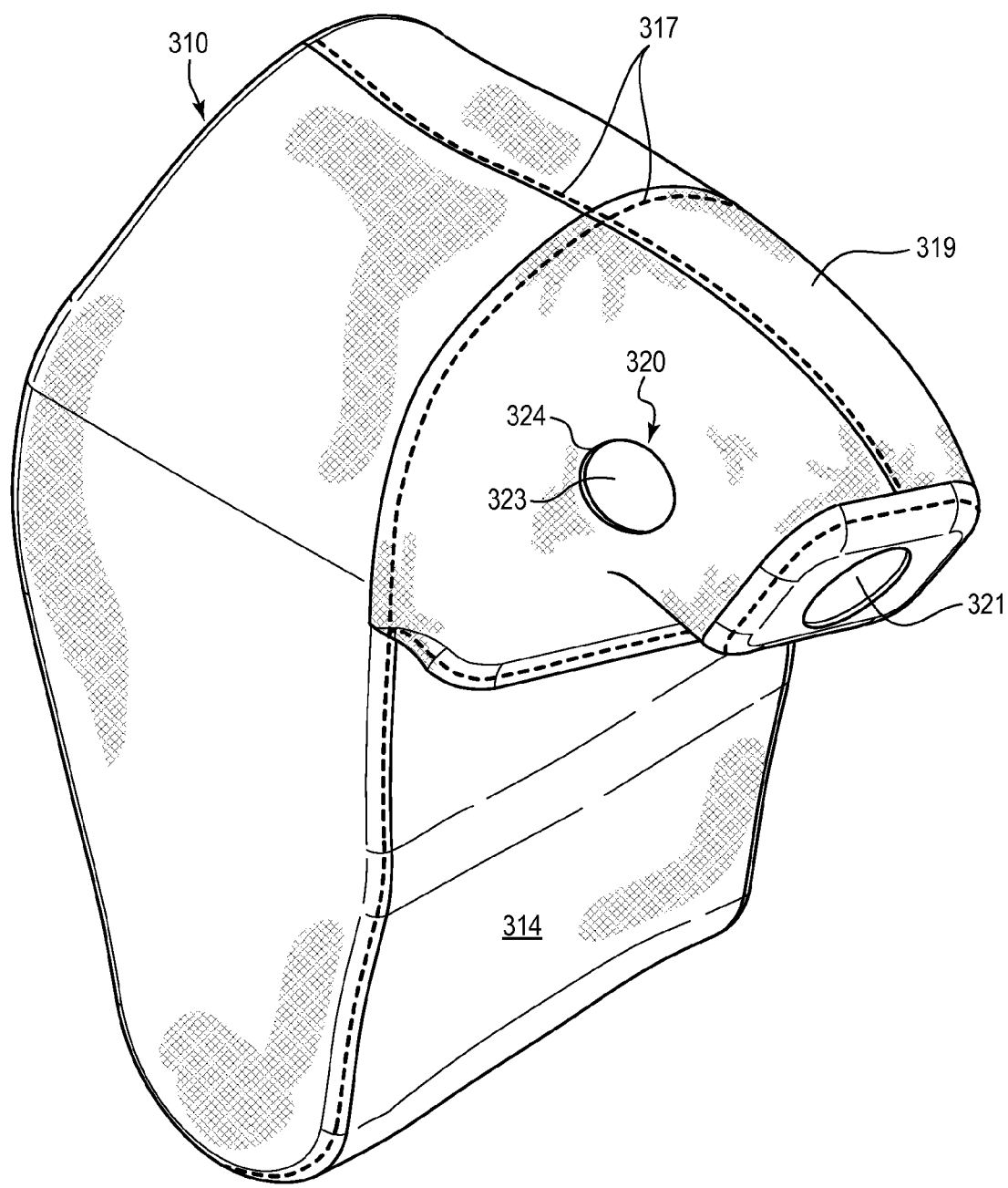
FIG. 9 is a perspective view of a portion of another embodiment of an airbag assembly.

In the depiction of FIG. 9, inflatable airbag assembly 300 comprises an airbag 310. Airbag 310 may comprise a plurality of panels of material that are coupled together via seams 317. A throat portion 319 may extend from a rear face 314. Throat portion 319 may comprise a vent 320 that has a vent aperture 323, which is defined by a perimeter 324. Throat portion 319 also comprises an inflator insert aperture 321.

Figure 10:
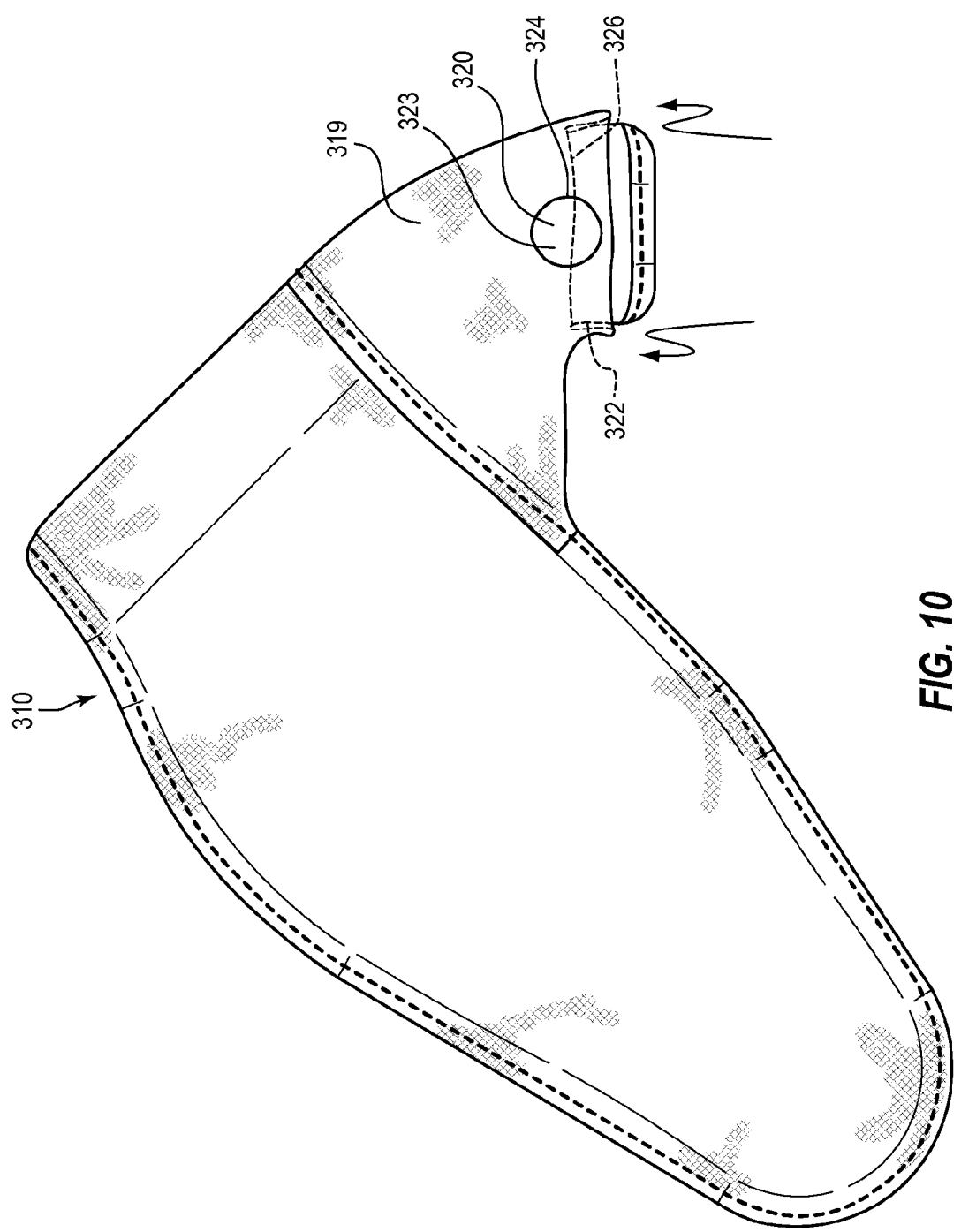
FIG. 10 is a side elevation view of the airbag of FIG. 9 after a throat portion of the airbag has been tucked.
Figure 11:
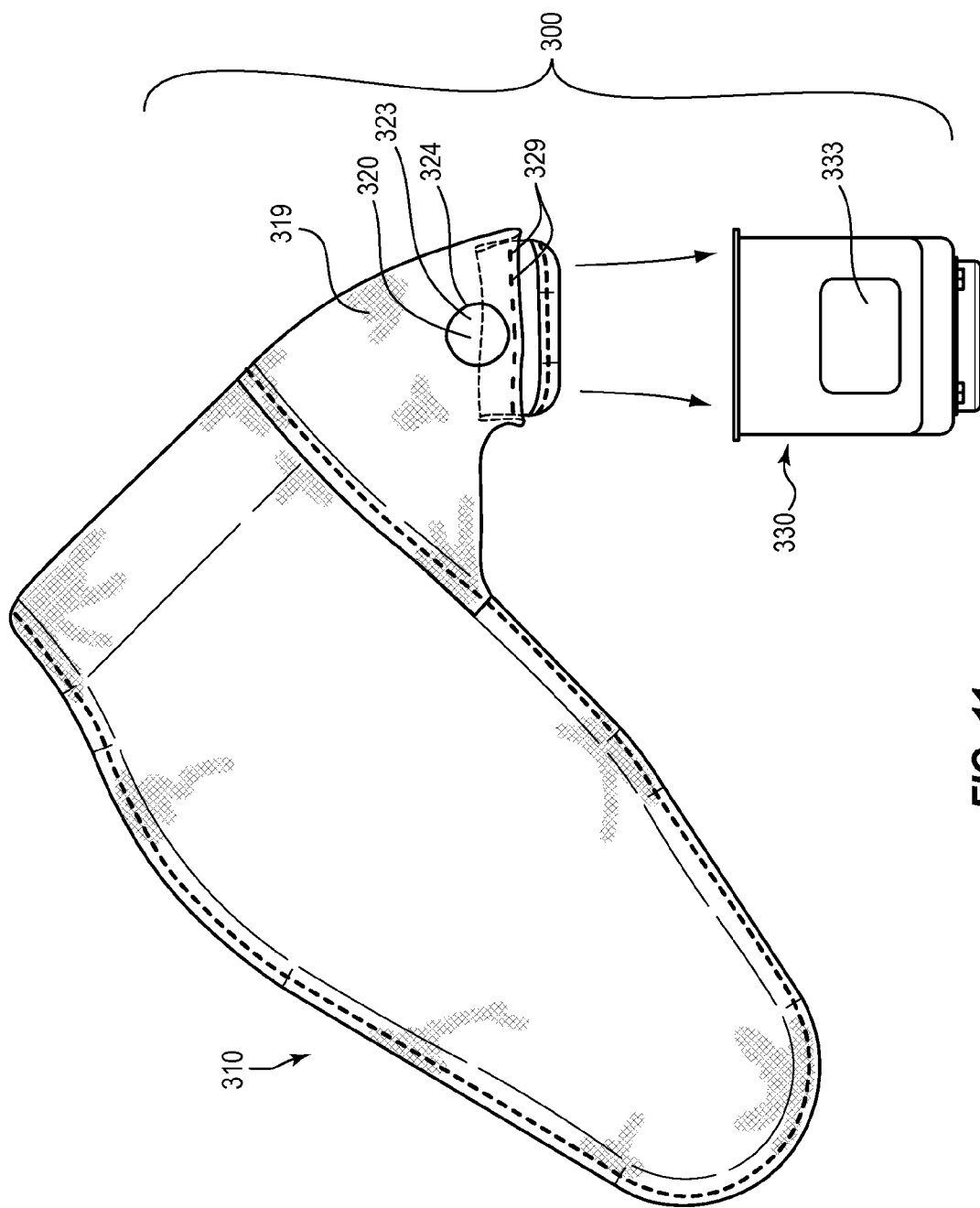
FIG. 11 is a side elevation view of the airbag of FIG. 10 after the tucked throat portion has been tack stitched.

FIGS. 10-11 are side elevation views of the airbag of FIG. 9. In the depiction of FIG. 10, a fold 322 has been formed in throat portion 319 of airbag 310. Fold 322 may be characterized as a tuck 322. Tuck 322 may be formed by pushing throat portion 319 inside itself until a top portion of tuck 326 at least partially blocks vent aperture 323 of vent 320. In other words, the tuck is formed such that the tucked portion of the throat at least partially overlaps perimeter 324 of vent 320. FIG. 11 depicts an airbag housing 330, into which airbag 310 may be rolled and/or folded. Airbag 310 is configured to be packaged into housing 330 such that vent aperture 323 of vent 320 of airbag 310 is at least partially aligned with a vent aperture 333 in housing 330. Airbag 310 may be retained in the folded, or tucked configuration via tear stitching 329, which couples together tucked portion 322. One skilled in the art will recognize that a variety of types and configurations of folds can be employed without departing from the spirit of the present disclosure. For example, the fold that forms the tuck can be made such that the tucked portion does not block or partially block the airbag vent aperture. The fold may be made outwardly instead of inwardly such that the fold does not form a tuck, but rather may be characterized as a reverse tuck.

Figure 12A:
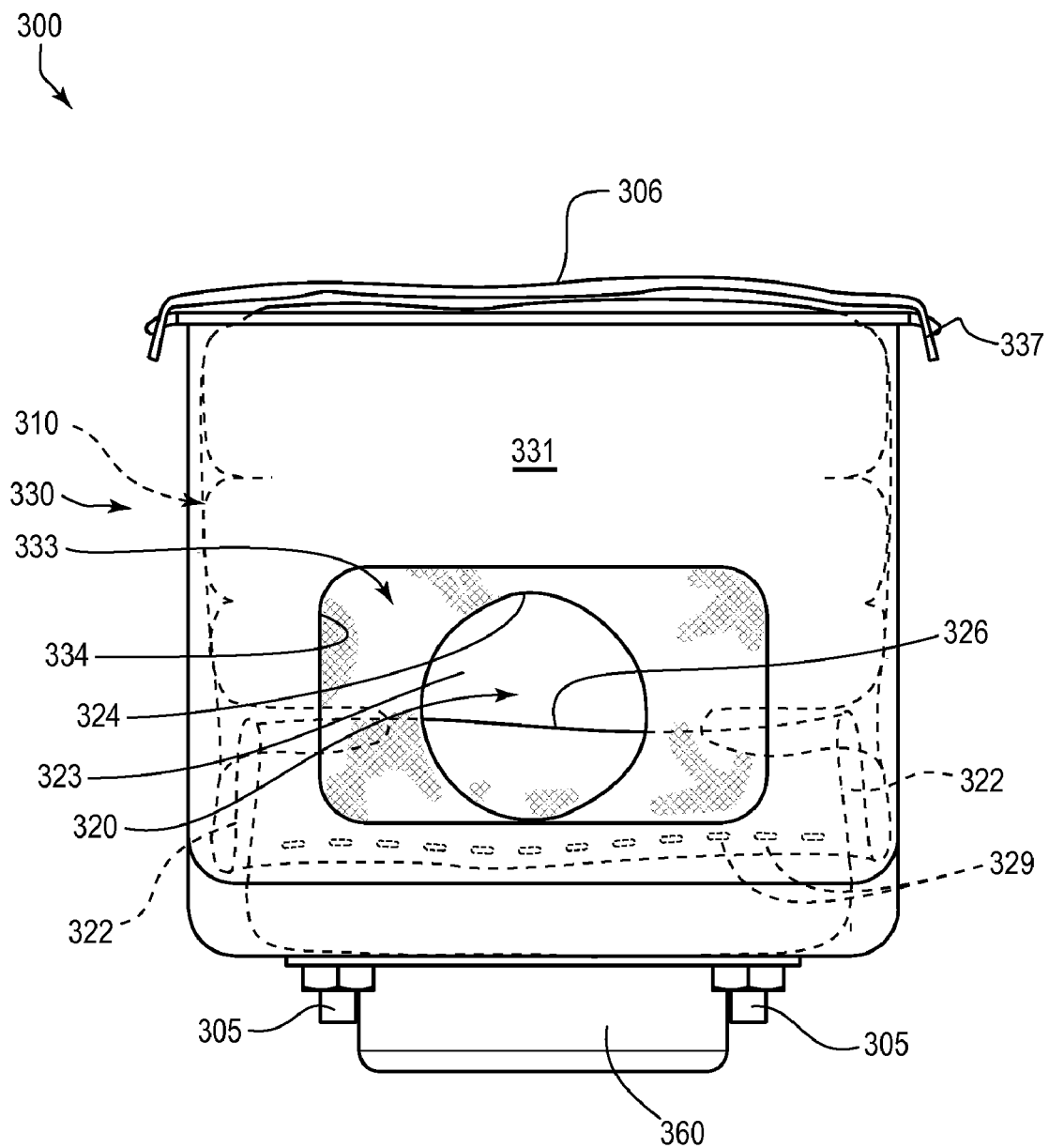
FIG. 12A is a side elevation view of the airbag assembly of FIG. 11 after the airbag has been coupled to an airbag housing, wherein the airbag assembly is in a packaged configuration.
Figure 12B:
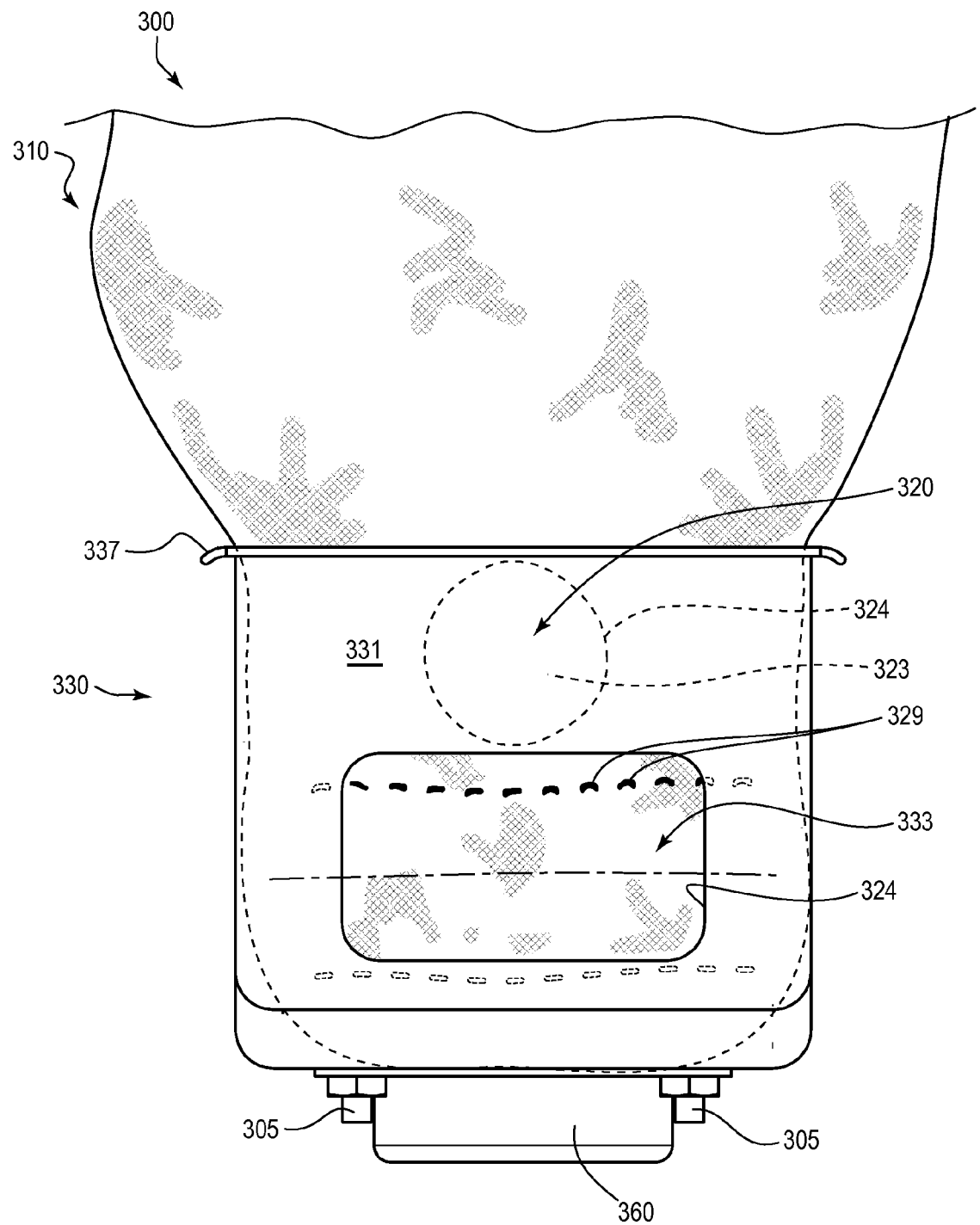
FIG. 12B is a side elevation view of the airbag assembly of FIG. 12A after the airbag has been deployed.

FIGS. 12A-12B depict airbag assembly 300. FIG. 12A depicts the assembly in a packaged configuration and FIG. 12B depicts the assembly in a deployed configuration. Airbag assembly 300 may comprise airbag 310, housing 330, a cover 306, and an inflator 360. Cover 306 may be coupled to housing 330 via hooks 337. In the depiction of FIG. 12A, airbag 310 has been rolled and/or folded into housing 330, which comprises vent aperture 333, located on a lateral sidewall 331. Housing vent aperture 333 is defined by perimeter 334. Likewise, airbag 310 vent aperture 323 is defined by perimeter 324.

In the depiction of FIG. 12A, airbag 310 and housing 330 may be described as being in an aligned configuration. While airbag 310 has not been deployed in FIG. 12A, airbag 310 and housing 330 may also be said to be in a 'deployment with obstruction' configuration, wherein vent aperture 323 is at least partially aligned with vent aperture 333 of housing 330. Perimeter 324 of aperture 323 may not be aligned with perimeter 334 of vent aperture 333. Tuck 322 has been formed in the throat portion of airbag 310 such that vent aperture 333 is at least partially obscured by tucked portion 322 of the airbag. In the depicted embodiment, top portion 326 of tuck 322 is positioned such that approximately one-half of vent aperture 333 is blocked by tuck 322. During early inflatable airbag deployment, or airbag deployment with obstruction, tear stitching 329 may not rupture, so that airbag 310 and housing 330 may be said to remain in the aligned configuration.

FIG. 12B depicts airbag assembly 300 in a deployed and inflated configuration, wherein the airbag has deployed without obstruction. Upon deployment without obstruction, tear stitching 329 is configured to rupture so that vent aperture 323 becomes misaligned with vent aperture 333 of housing 330. As such, FIG. 12B may be said to depict the misaligned configuration of airbag assembly 300. In the misaligned configuration, a magnitude of inflation gas that can be vented by vent 320 is reduced, when compared to the aligned configuration.

FIGS. 13-17C depict another embodiment of an airbag assembly 400, wherein airbag assembly 400 resembles airbag assemblies 100, 200, and 300 described above, in certain respects. Accordingly, like features may be designated with like reference numerals, with the leading hundreds numeral incremented from "1", "2", or "3" to "4". Any suitable combination of the features described with respect to airbag assemblies 100, 200, and 300 with assembly 400, and vice versa.

Figure 13:
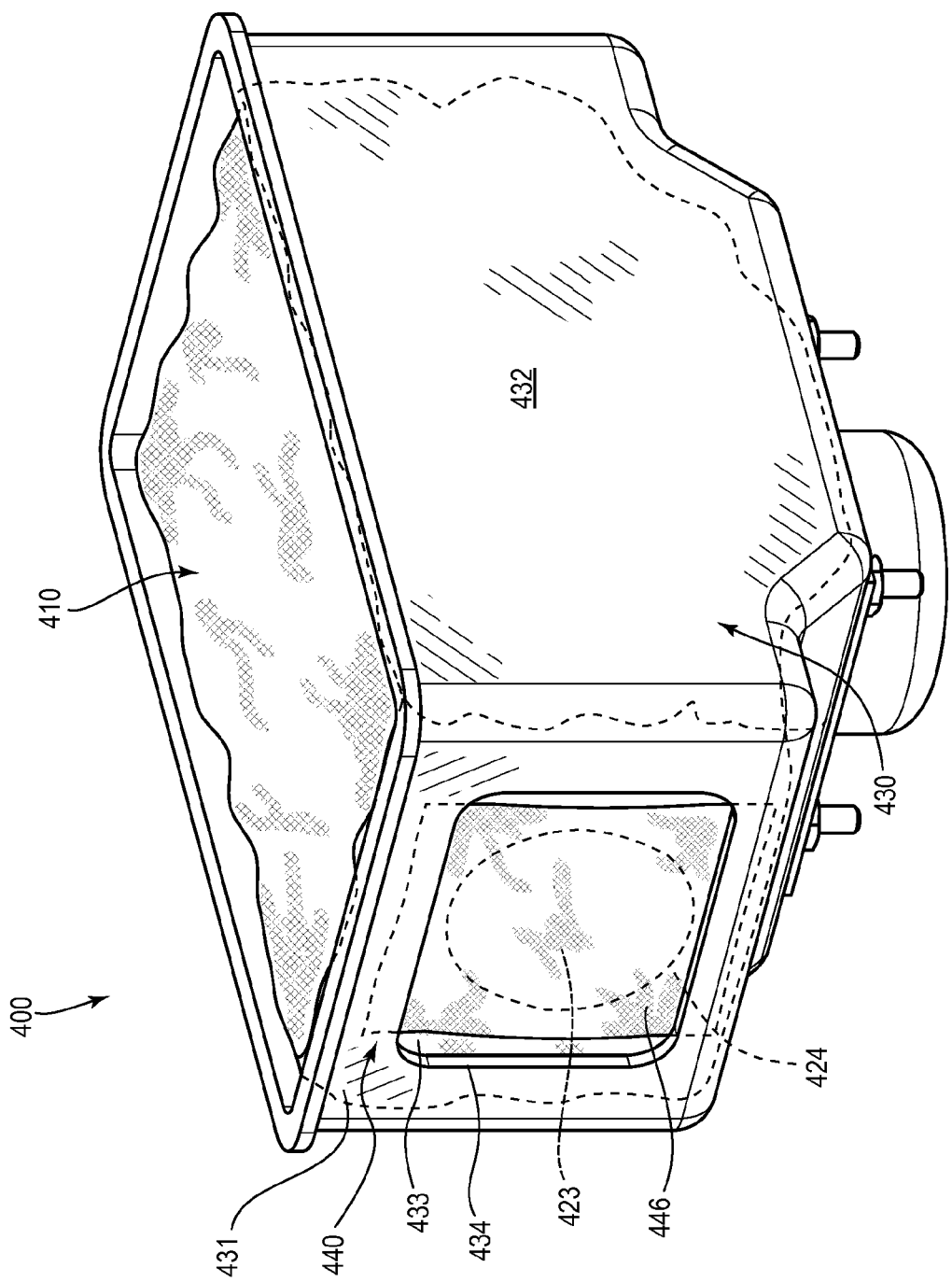
FIG. 13 is a perspective view of another embodiment of an airbag assembly with a vent panel.

FIG. 13 depicts a perspective view of airbag assembly 400 in a packaged configuration. In FIG. 13, airbag assembly 400 is also in an aligned configuration. Airbag assembly 400 may comprise an inflatable airbag 410, a housing 430, and a vent panel 440. Airbag 410 comprises a vent aperture 423 that is defined by a perimeter 424. Housing 430 comprises lateral sidewall 431 and longitudinal sidewall 432. Lateral sidewall 431 comprises a vent aperture 433 that is defined by a perimeter 434. Vent panel 440 comprises a body portion 446 that blocks vent aperture 423.

Figure 14:
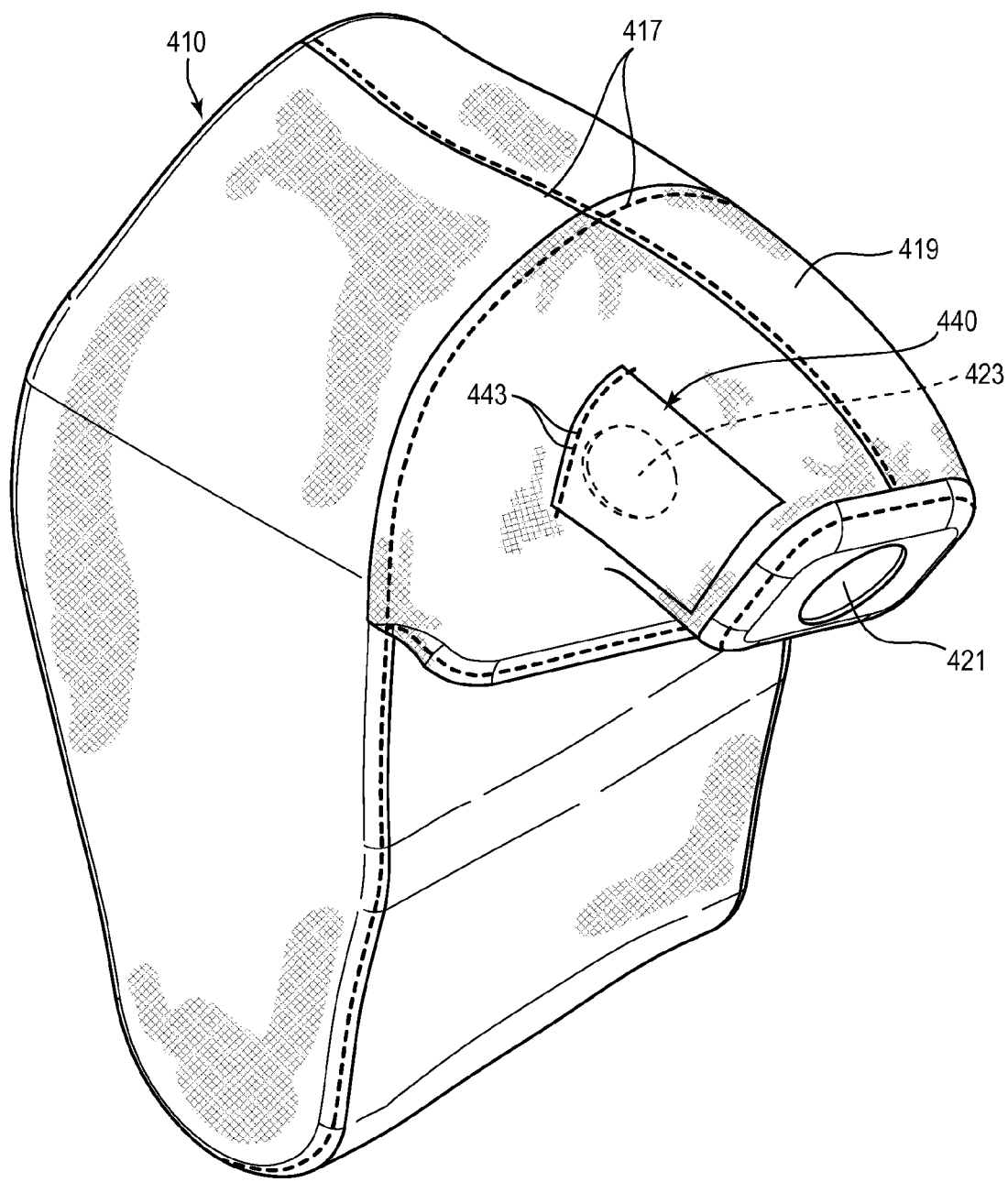
FIG. 14 is a perspective view of a portion of the airbag assembly of FIG. 13.

FIG. 14 is a perspective view of airbag 410, which is a component of airbag assembly 400. Airbag 410 may comprise a plurality of faces that are coupled together at seams 417. Airbag 410 may also comprise a throat portion, on which vent aperture 423 is located as well as inflator insert aperture 421. Vent panel 440 may be coupled to airbag 410 via stitching 443.

Figure 15:
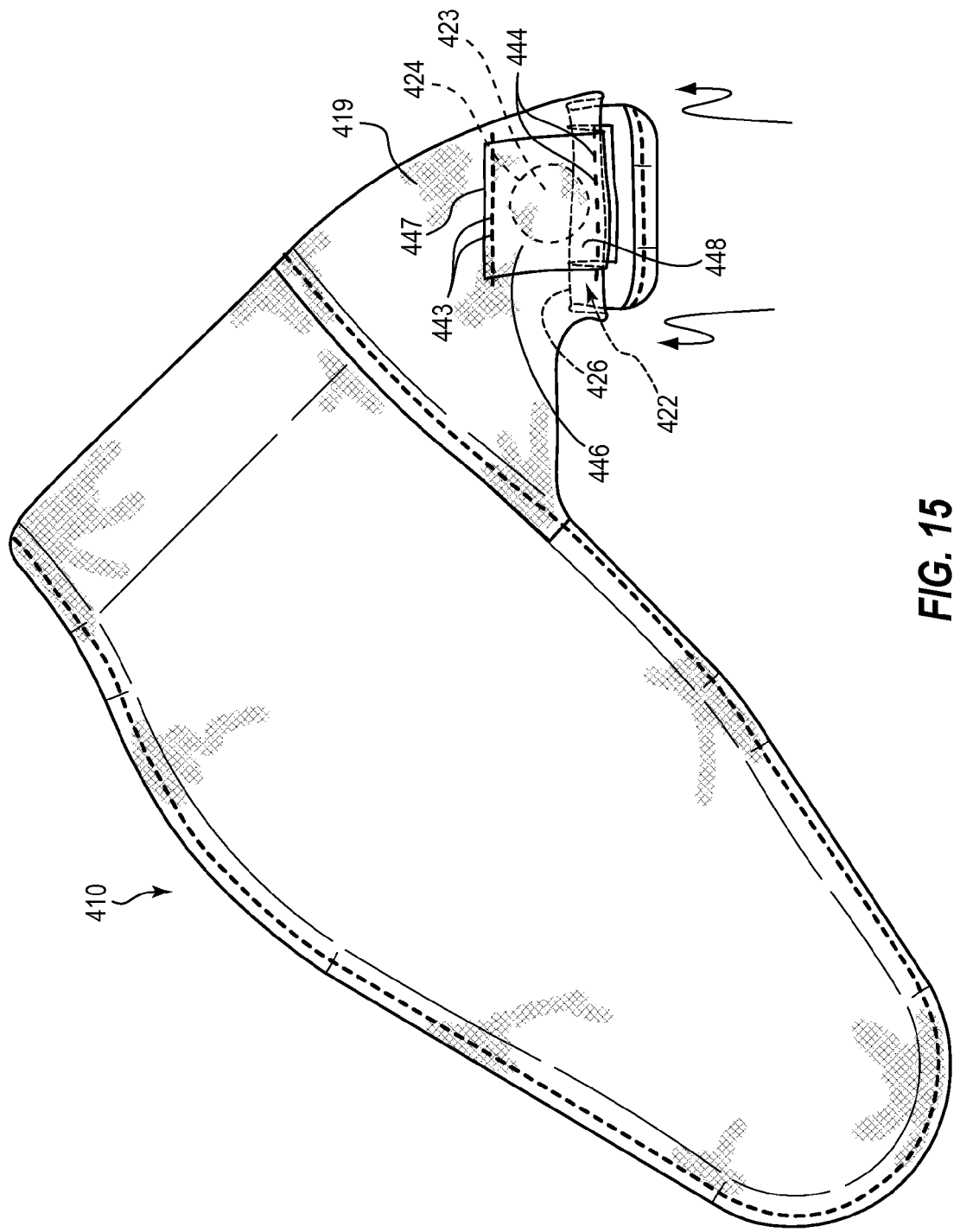
FIG. 15 is a side elevation view of the portion of the airbag assembly of FIG. 14 after a throat portion has been tucked and tack stitched.

FIG. 15 is a side elevation view of airbag 410, which is a component of airbag assembly 400. In the depicted embodiment, throat portion 419 has been tucked inside itself, such that the airbag comprises a tucked portion 422. A top portion 426 of tucked portion 422 extends such that at least a portion of vent aperture 423 is blocked by the tucked portion of airbag 410. Vent panel 440 may be coupled to airbag 410 at an upper portion 447 of the vent panel via stitching 443. A lower portion 448 of vent panel 440 may be coupled to throat portion 419 via a rupture seam 444, which in the depicted embodiment comprises tear stitching 444. Vent panel 440 is configured such that a body portion 446 fully covers vent aperture 423 and perimeter 424. In the depicted embodiment, lower portion 448 of vent panel 440 is coupled to an upper portion of tucked portion 422. In another embodiment, vent panel 440 may extend such that tear stitching 444 is located on a lower portion of tucked portion 422.

Figure 16:
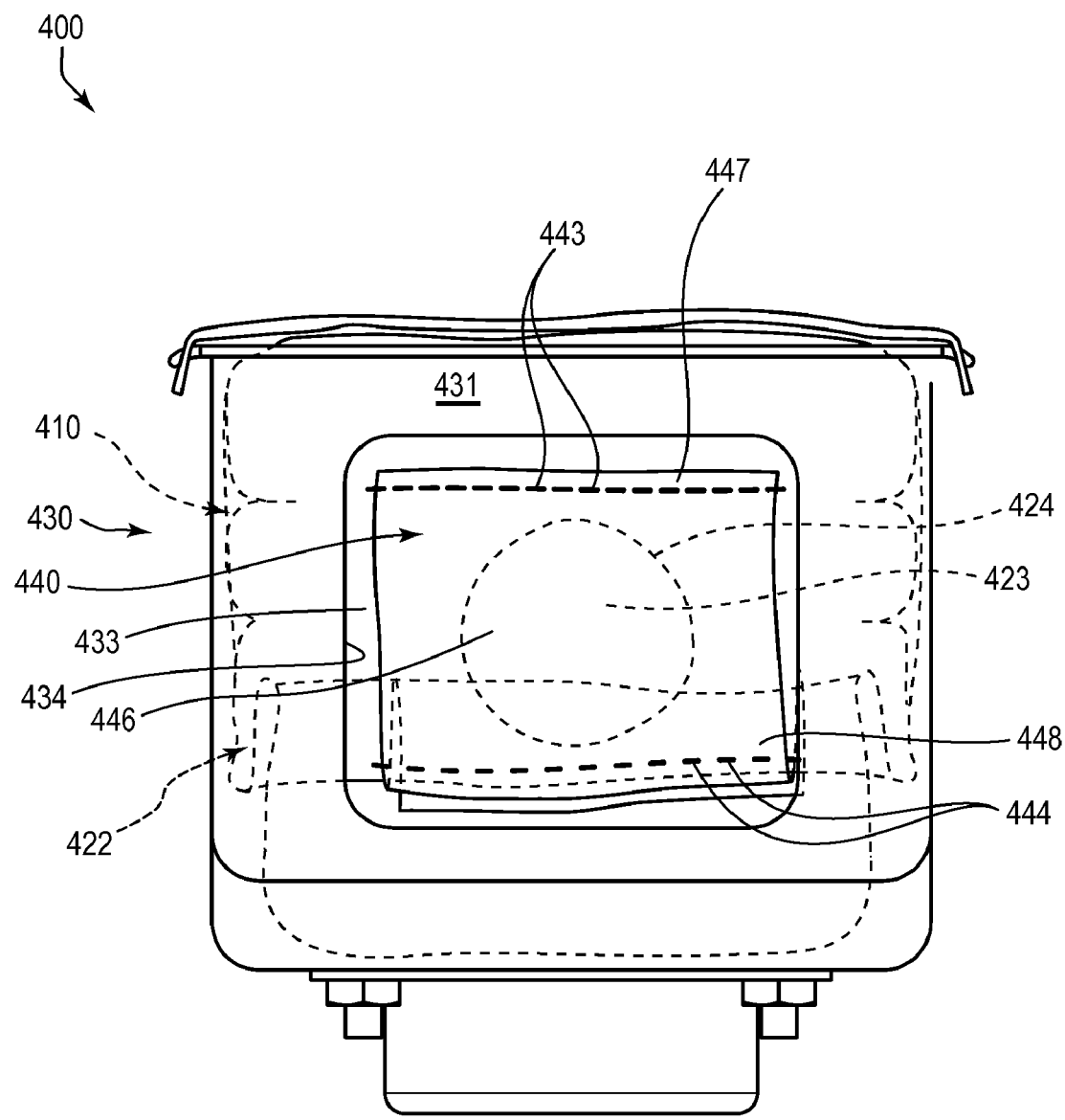
FIG. 16 is a side elevation view of the airbag assembly of FIG. 13, wherein the airbag assembly is in a packaged configuration.

FIG. 16 is a side elevation view of airbag assembly 400, wherein the assembly is in a packaged configuration. Airbag 410 has been rolled and/or folded and placed within airbag housing 430. Lateral sidewall 431 comprises a vent aperture 433 that is defined by a perimeter 434. Vent panel 440 is coupled to airbag 410 at upper portion 447 via stitching 443. Lower portion 448 of vent panel 440 is coupled to tucked portion 422 via tear stitching 444. Body portion 446 of vent panel 440 blocks vent aperture 423 and perimeter 424.

Figure 17A:
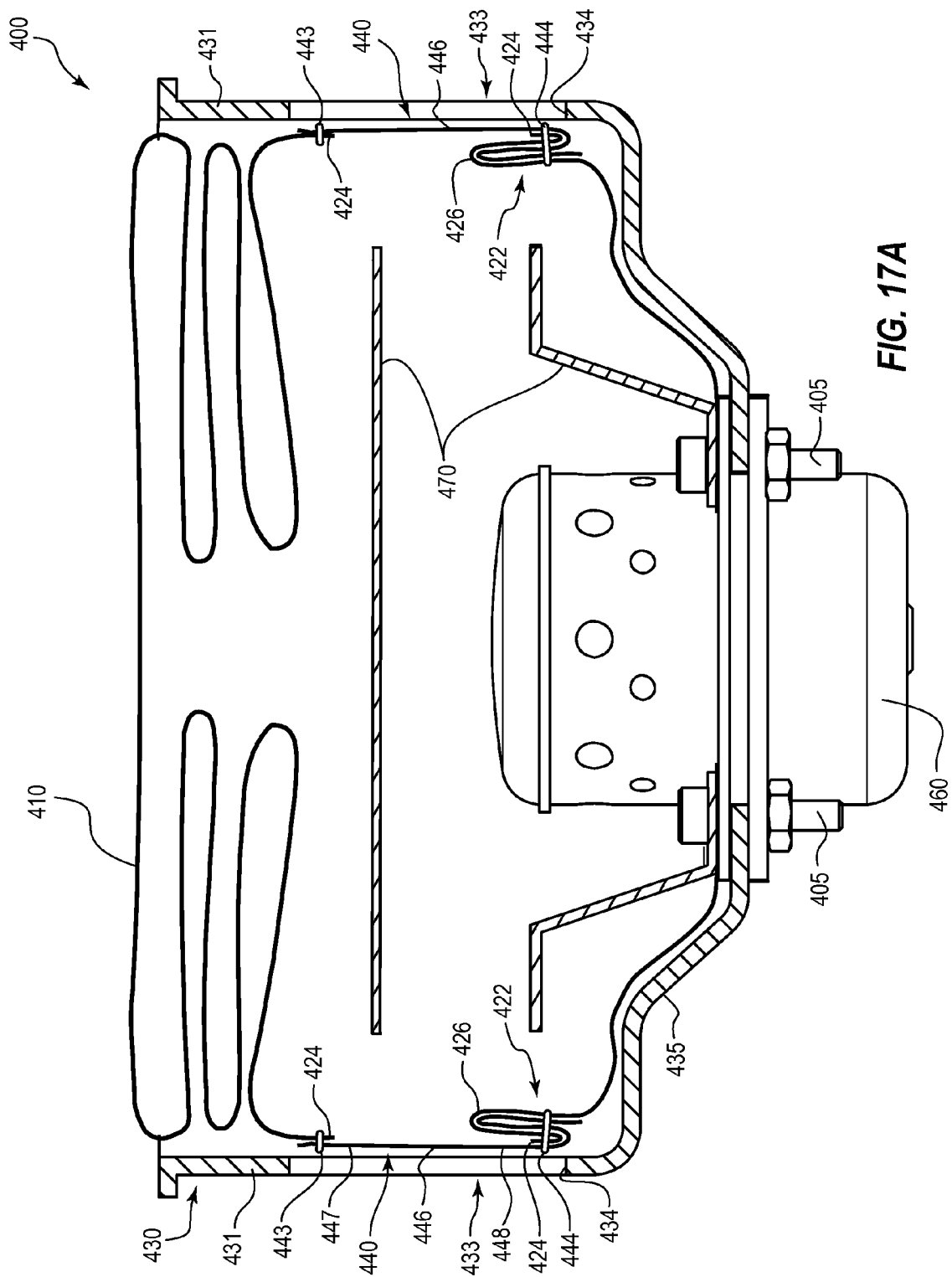
FIG. 17A is a cross-sectional view of the airbag assembly of FIG. 16, wherein the assembly is depicted in a packaged configuration.
Figure 17B:
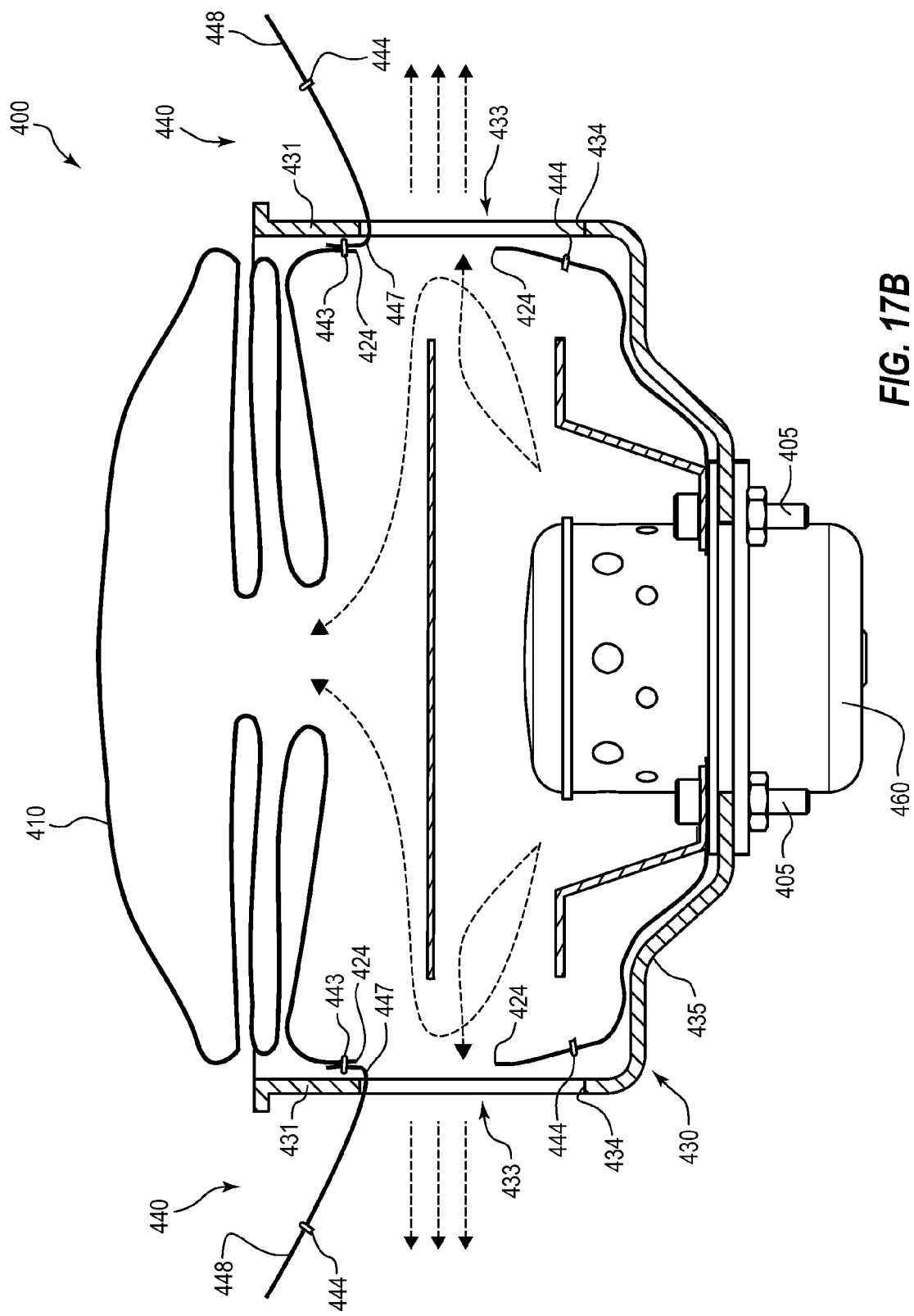
FIG. 17B is a cross-sectional view of the airbag assembly of FIG. 17A, wherein the airbag assembly is in an early phase of airbag deployment.
Figure 17C:
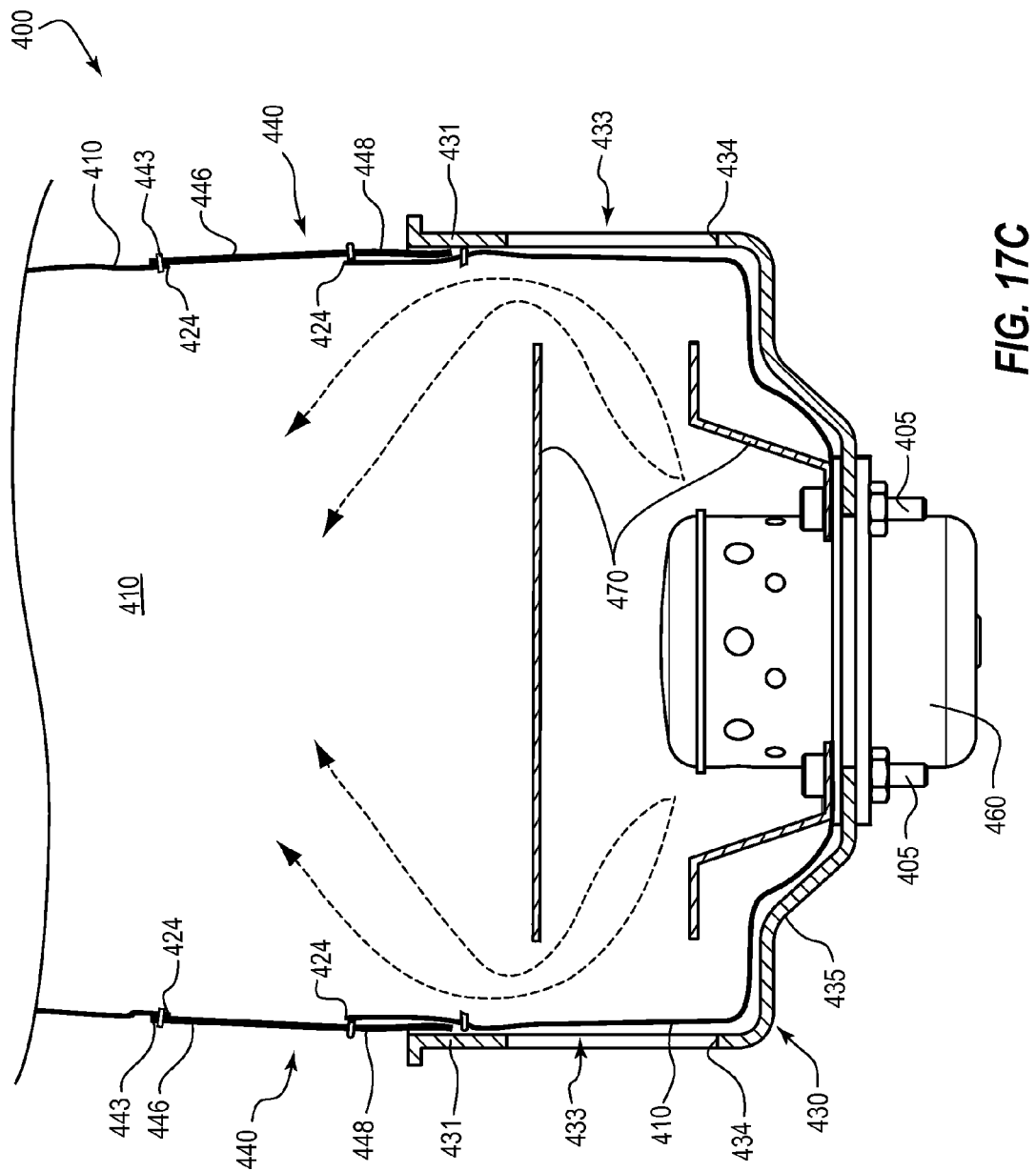
FIG. 17C is a cross-sectional view of the airbag assembly of FIG. 17B, wherein the airbag assembly is in a later phase of airbag deployment.

FIGS. 17A-17C are cross-sectional views of assembly 400, wherein the figures depict a representational inflatable airbag deployment sequence. FIG. 17A depicts the assembly before initiation of the inflator. FIG. 17B depicts assembly 400 in a mid-stage of airbag deployment. FIG. 17C depicts assembly 400 in a late stage of airbag deployment. In FIGS. 17A-17C, inflatable airbag 410, housing 430, inflator 460 and diffuser 470 are coupled together at bottom wall 435 of housing 430 via mounting structures 405. Housing vent apertures 433 defined by vent aperture perimeters 434 are located in lateral sidewalls 431. Diffuser 470 is an optional component of assembly 400. Diffuser 470 may comprise a fabric component that may comprise a plurality of apertures. Some of the apertures of diffuser 470 may be configured such that diffuser 470 directs some inflation gas toward airbag 410 vent apertures that are defined by vent aperture perimeters 424. Vent panel 440 may be coupled to airbag 410 at an upper portion 447 of the vent panel via stitching 443.

FIG. 17A depicts a cross-sectional illustration of assembly 400 in the packaged configuration. Airbag 410 has been rolled and/or folded and vent panel 440 has been coupled to the airbag. The throat portion of airbag 410 also comprises a fold 422, which may be characterized as a tuck 422, wherein top portion 426 of the tuck at least partially blocks the vent aperture of airbag 410 that is defined by perimeter 424. In the packaged and aligned configuration, apertures 423 and 433 are at least partially aligned. Lower portion 448 of vent panel 440 is coupled to airbag 410 via tear stitching 444. Also, tear stitching 444 retains airbag 410 in the folded configuration. Body portion 446 may be located between airbag 410 vent apertures defined by vent aperture perimeters 424 and apertures 433 of housing 430. As such, the airbag vents may be said to be in the closed configuration, and the vent panel may be said to be located between airbag 410 and housing 430. In the depicted embodiment, bottom portion 448 of vent panel 440 is not coupled to airbag 410.

FIG. 17B depicts assembly 400 after inflator 460 has been initiated and inflation gas (depicted as arrows) has begun to be generated and/or released by the inflator. FIG. 17B may also be said to depict assembly 400 at an early stage of airbag deployment. Early in airbag deployment, airbag 410 may not exit housing 430, but may begin to become inflated; alternatively, early in airbag deployment, airbag 410 may begin to exit housing 430. Deflector 470 at least partially directs inflation gas toward vent apertures of airbag 410 that are defined by perimeters 424. When pressure, or tension, is applied to vent panel 440 by the inflation gas, tear stitching 444 may rupture, thereby allowing airbag 410 to be released from the folded configuration and lower portion 448 of the vent panel to become uncoupled from airbag 410. As such, bottom portion 448 may be pushed out of housing 430 via aperture 433. As illustrated in the figures, a large portion of vent panel 440 may exit housing 430 via apertures 433, and therefore, it may be said that at least the lower portion 448 of the vent panel may be pushed out of the housing by inflation gas. Upper portion 447 of vent panel 440 remains coupled to airbag 410 via stitching 443 such that the vent panel is not released from the airbag and completely blown out of housing 430.

If during deployment, airbag 410 encounters an obstruction, such as a child car seat or out-of-position occupant, the airbag may not fully deploy. In such a case, airbag 410, vent aperture 433, and vent panel 440 may remain in an aligned configuration, such as depicted in FIG. 17B. The aligned configuration may comprise an at least partial alignment of the airbag vent aperture 423 with the housing vent aperture 433. The aligned configuration may further include the rupture seams of the vent panel having been ruptured such that the airbag vent may be said to be in an open configuration.

FIG. 17C is a cross-sectional view of assembly 400 in a later stage of inflatable airbag deployment without obstruction, wherein inflatable airbag 410 is in a deployed and inflated configuration. In the later stage of inflatable airbag 410 deployment, inflation gas from inflator 460 continues to inflate the airbag such that the airbag is pushed further out of housing 430. Since upper region 447 of vent panel 440 remains coupled to airbag 410 via stitching 443, the vent panel is pulled further out of housing 430 along with the airbag. As a result, lower portion 448 of vent panel 440 may be pulled back through vent aperture 433. Vent panel 440 may be configured to overlap vent aperture perimeter 424 of airbag 410, such that when lower portion 448 is pulled back into housing 430, the lower portion may be located between vent aperture perimeter 424 and lateral sidewall 431 of housing 430. Since a magnitude of air pressure within the airbag is greater than a magnitude of air pressure outside the airbag, lower portion 448 of vent panel 440 may be said to be "pinched" or "pressed" between airbag 410 and housing 430. Specifically, lower portion 440 may be pressed in an outward direction by a bottom portion of perimeter 424, and the outward pressure may be opposed by lateral sidewall 431. As such, vent aperture 423 of airbag 410 may be said to be in a closed configuration.

Deflector 470 may continue to direct inflation gas toward housing vent aperture 433; however, the vent aperture may be blocked by airbag 410. As such, vent aperture 433 of airbag housing 430 may be said to be in a closed configuration. Several features of airbag assembly 400 have predetermined dimensions such that in the deployed configuration, the airbag vent apertures and the housing vent apertures may be said to be in a closed configuration. For example, a length of airbag 410, a location and circumference of vent aperture perimeter 424, and a length of vent panel 440 are all predetermined such that in the deployed configuration, bottom portion 448 of vent panel 440 does not extend beyond sidewall 431 or rim 436 of housing 430, and vent panel 440 covers vent aperture perimeter 424.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
an airbag housing having a vent aperture; and
an inflatable airbag coupled to the airbag housing, wherein the inflatable airbag has a vent aperture that is at least partially aligned with the vent aperture in the airbag housing; and,
an inflator in fluid communication with the inflatable airbag, wherein the inflator is configured to be activated by a vehicle sensor; and,
a vent panel coupled to the airbag at a first location on an upper portion of the vent panel, wherein in a packaged configuration, the vent panel covers the vent aperture in the inflatable airbag, and wherein the vent panel is located between the inflatable airbag vent aperture and the housing vent aperture, and
wherein during initial inflatable airbag deployment, inflation gas causes at least a portion of the vent panel to be pushed away from the inflatable airbag vent aperture such that the vent panel is pushed partially through the vent aperture in the airbag housing to enable inflation gas to exit the inflatable airbag assembly via the vent apertures in the inflatable airbag and the housing, and
wherein during inflatable airbag deployment with obstruction, the vent panel continues to be pushed away from the inflatable airbag vent aperture and partially through the vent aperture in the airbag housing, such that inflation gas continues to exit the inflatable airbag assembly via the apertures in the inflatable airbag and the housing, and wherein during inflatable airbag deployment without obstruction, the vent panel is pulled back through the housing vent aperture and pressed against a portion of the housing such that an amount inflation gas exiting the inflatable airbag assembly is reduced.

2. The inflatable airbag assembly of claim 1, wherein the assembly further comprises a diffuser that is coupled to the airbag housing and located within an inflatable void of the inflatable airbag, wherein the diffuser directs inflation gas from the inflator toward the airbag housing vent aperture.

3. The inflatable airbag assembly of claim 1, wherein the vent panel is configured to retain the inflatable airbag vent aperture in at least partial alignment with the housing vent aperture.

4. The inflatable airbag assembly of claim 1, wherein when the assembly is in a packaged configuration, the vent panel blocks debris from entering the inflatable airbag via the airbag vent aperture.

5. The inflatable airbag assembly of claim 1, wherein the vent panel further comprises a rupture point that is configured to rupture when the inflator is activated during inflatable airbag deployment.

6. The inflatable airbag assembly of claim 1, wherein during inflatable airbag deployment, the vent panel is retained on the inflatable airbag.

7. The inflatable airbag assembly of claim 1, wherein the vent panel is coupled to the airbag at a second location.

8. The inflatable airbag assembly of claim 7, wherein the vent panel is coupled to the airbag at the second location via tear stitching.

9. The inflatable airbag assembly of claim 7, wherein the vent panel is coupled to the airbag at a third location.

10. An inflatable airbag assembly, comprising:
an airbag housing having a vent aperture; and
an inflatable airbag coupled to the airbag housing, wherein the inflatable airbag has a vent aperture that is at least partially aligned with the vent aperture in the airbag housing; and,
an inflator in fluid communication with the inflatable airbag, wherein the inflator is configured to be activated by a vehicle sensor; and,
a vent panel coupled to the airbag at a first location on an upper portion of the vent panel, wherein in a packaged configuration, the vent panel covers the vent aperture in the inflatable airbag, and wherein the vent panel is located between the inflatable airbag vent aperture and the housing vent aperture, and
wherein the vent panel comprises a plurality of extensions that extend away from the upper portion of the vent panel and are coupled to the housing such that the vent panel retains the airbag vent aperture in alignment with the housing vent aperture, and
wherein during initial inflatable airbag deployment, inflation gas causes a second portion of vent panel, that is opposite the upper portion, to be pushed away from the inflatable airbag vent aperture such that the vent panel is pushed partially through the vent aperture in the airbag housing to permit inflation gas to exit the inflatable airbag assembly via the vent apertures in the inflatable airbag and the housing, and
wherein during inflatable airbag deployment with obstruction, the vent panel continues to be pushed away from the inflatable airbag vent aperture and partially through the vent aperture in the airbag housing, such that inflation gas continues to exit the inflatable airbag assembly via the apertures in the inflatable airbag and the housing, and wherein during inflatable airbag deployment without obstruction, the vent panel is pulled back through the housing vent aperture pressed against a portion of the housing such that an amount inflation gas exiting the inflatable airbag assembly is reduced.

11. The inflatable airbag assembly of claim 10, wherein the assembly further comprises a diffuser that is coupled to the airbag housing and located within an inflatable void of the inflatable airbag, wherein the diffuser directs inflation gas from the inflator toward the airbag housing vent aperture.

12. The inflatable airbag assembly of claim 10, wherein the vent panel substantially comprises a "T" shape.

13. The inflatable airbag assembly of claim 10, wherein the vent panel substantially comprises a "Y" shape.

14. The inflatable airbag assembly of claim 10, wherein each of the extensions of the vent panel comprise an aperture.

15. The inflatable airbag assembly of claim 14, wherein the housing comprises a plurality of extensions that extend away from a rim of the housing and receive one of the apertures of the vent panel extensions.

16. The inflatable airbag assembly of claim 10, the second portion comprises a bottom portion of the vent panel.

17. The inflatable airbag assembly of claim 16, wherein the bottom portion of the vent panel is coupled to the inflatable airbag via tear stitching that is configured to rupture during initial inflatable airbag deployment.

18. The inflatable airbag assembly of claim 10, wherein the second portion comprises a first side portion.

19. The inflatable airbag assembly of claim 18, wherein the vent panel is also coupled to the inflatable airbag at a third portion.

20. The inflatable airbag assembly of claim 19, wherein the third portion comprises a second side portion that is opposite the first side portion.

21. The inflatable airbag assembly of claim 20, wherein the vent panel is sewn to the inflatable airbag at the upper portion and each of the first and second side portions, such that the vent panel is attached to the inflatable airbag at three rows of stitches.

22. The inflatable airbag assembly of claim 21, wherein the vent panel comprises a first set of perforations and a second set of perforations, and wherein each of the sets of perforations are located on an inward side of the rows of stitches on the first and second side portions of the vent panel, and
wherein upon initial inflatable airbag deployment, both the first and second sets of perforations rupture such that a middle portion and a bottom portion of the vent panel is pushed through the housing vent aperture.

23. An inflatable airbag assembly, comprising:
an airbag housing having a vent aperture; and,
an inflatable airbag coupled to the airbag housing, wherein the inflatable airbag comprises a folded throat portion and a vent aperture, and
wherein the throat portion is retained in a folded configuration via tear stitching, and
wherein upon inflatable airbag deployment with obstruction, the tear stitching does not rupture and inflation gas can exit the inflatable airbag assembly via the vent apertures in the inflatable airbag and the housing, and
wherein upon inflatable airbag deployment without obstruction, the tear stitching ruptures and the vent aperture of the inflatable airbag and the vent aperture of the housing become misaligned.

24. The inflatable airbag assembly of claim 23, wherein the fold comprises a tuck.

25. The inflatable airbag assembly of claim 24, wherein the throat portion has been tucked such that a top portion of the tuck at least partially blocks the vent aperture.

26. The inflatable airbag assembly of claim 25, wherein the inflatable airbag assembly further comprises a vent panel that is coupled to the inflatable airbag at the tucked throat portion, such that in a packaged configuration, the vent aperture in the airbag is blocked by the vent panel.

27. The inflatable airbag assembly of claim 26, wherein during initial inflatable airbag deployment, inflation gas causes a portion of vent panel to be pushed away from the inflatable airbag vent aperture such that the vent panel is pushed partially through the vent aperture in the airbag housing to enable inflation gas to exit the inflatable airbag assembly via the vent apertures in the inflatable airbag and the housing.

28. The inflatable airbag assembly of claim 23, wherein during inflatable airbag deployment without obstruction, the portion of the vent panel that was pushed through the vent aperture is pulled back through the housing vent aperture and is pressed against a portion of the housing such that an amount of inflation gas exiting the inflatable airbag assembly via the airbag vent aperture is reduced.

* * * * *